United States Patent
Park et al.

(10) Patent No.: US 12,487,644 B2
(45) Date of Patent: Dec. 2, 2025

(54) DISPLAY DEVICE

(71) Applicant: Samsung Display Co., LTD., Yongin-si (KR)

(72) Inventors: In Soo Park, Hwaseong-si (KR); Se Yong Kim, Anyang-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 272 days.

(21) Appl. No.: 18/141,376

(22) Filed: Apr. 29, 2023

(65) Prior Publication Data

US 2023/0259177 A1    Aug. 17, 2023

Related U.S. Application Data

(63) Continuation of application No. 17/151,261, filed on Jan. 18, 2021, now Pat. No. 11,675,395.

(30) Foreign Application Priority Data

May 15, 2020    (KR) .................. 10-2020-0058431

(51) Int. Cl.
*G06F 1/16*    (2006.01)
*H04M 1/02*    (2006.01)

(52) U.S. Cl.
CPC .......... *G06F 1/1681* (2013.01); *G06F 1/1616* (2013.01); *H04M 1/0268* (2013.01)

(58) Field of Classification Search
CPC .... G06F 1/1616; G06F 1/1652; G06F 1/1681; H04M 1/022; H04M 1/0268
See application file for complete search history.

(56) References Cited

U.S. PATENT DOCUMENTS

| | | | |
|---|---|---|---|
| 9,021,658 B1 * | 5/2015 | Yang | G06F 1/1681 |
| | | | 16/366 |
| 9,778,704 B2 | 10/2017 | Motosugi | |
| 9,786,207 B2 | 10/2017 | Kim et al. | |
| 10,032,391 B2 | 7/2018 | Kim et al. | |
| 11,068,032 B2 | 7/2021 | Huang et al. | |

(Continued)

FOREIGN PATENT DOCUMENTS

| | | |
|---|---|---|
| CN | 1852340 A | 10/2006 |
| CN | 1892921 A | 1/2007 |

(Continued)

OTHER PUBLICATIONS

Extended European Search Report—European Application No. 21171740.0 dated Feb. 8, 2022, citing references listed within.

*Primary Examiner* — Anthony Q Edwards
(74) *Attorney, Agent, or Firm* — CANTOR COLBURN LLP

(57) ABSTRACT

A display device includes: a display module including a first surface which displays an image and a second surface opposite to the first surface; a hinge disposed on the second surface of the display module; and a pair of supporting members connected to sides of the hinge and rotatable with respect to a pair of first rotation axes, respectively. The hinge includes: a base frame; a pair of hinge pins coupled to the base frame and providing a pair of second rotation axes, respectively, which are different from the pair of first rotation axes; and a pair of hinge barrels rotatably coupled to the pair of hinge pins, respectively.

20 Claims, 19 Drawing Sheets

(56) References Cited

U.S. PATENT DOCUMENTS

| | | |
|---|---|---|
| 11,372,453 B2 | 6/2022 | Yu et al. |
| 11,675,395 B2 * | 6/2023 | Park .................. G06F 1/1652 |
| | | 361/679.01 |
| 12,254,139 B2 * | 3/2025 | Tien .................. G06F 1/1667 |
| 2009/0007384 A1 * | 1/2009 | Lin .................. G06F 1/1616 |
| | | 16/386 |
| 2010/0199534 A1 | 8/2010 | Larsen et al. |
| 2012/0120618 A1 | 5/2012 | Bohn |
| 2012/0307472 A1 * | 12/2012 | Bohn .................. G06F 1/1652 |
| | | 361/807 |
| 2014/0020209 A1 * | 1/2014 | Hsu .................. G06F 1/1681 |
| | | 16/386 |
| 2016/0378146 A1 | 12/2016 | Sprenger et al. |
| 2017/0260786 A1 | 9/2017 | Sprenger et al. |
| 2018/0059740 A1 | 3/2018 | Kato |
| 2018/0066465 A1 | 3/2018 | Tazbaz et al. |
| 2018/0210496 A1 | 7/2018 | Lin |
| 2019/0200470 A1 | 6/2019 | Woo |
| 2021/0250431 A1 | 8/2021 | Park et al. |
| 2022/0137676 A1 | 5/2022 | Tian et al. |

FOREIGN PATENT DOCUMENTS

| | | | |
|---|---|---|---|
| CN | 104832531 A | | 8/2015 |
| CN | 110410413 | | 11/2019 |
| CN | 110410413 A | * | 11/2019 |
| CN | 110580854 A | | 12/2019 |
| CN | 110780709 A | | 2/2020 |
| CN | 210225477 U | | 3/2020 |
| EP | 3489795 | | 5/2019 |
| KR | 1020160118407 A | | 10/2016 |
| KR | 1020170026023 | | 3/2017 |
| KR | 1020190082357 A | | 7/2019 |
| KR | 1020200026644 | | 3/2020 |
| WO | 2017142258 A2 | | 8/2017 |

* cited by examiner

DISPLAY DEVICE

This application is a continuation of U.S. patent application Ser. No. 17/151,261, filed on Jan. 18, 2021, which claims priority to Korean Patent Application No. 10-2020-0058431 filed on May 15, 2020, and all the benefits accruing therefrom under 35 U.S.C. § 119, the content of which in its entirety is herein incorporated by reference.

BACKGROUND

1. Technical Field

The present disclosure relates to a display device.

2. Description of the Related Art

The importance of a display device has steadily increased with the development of multimedia technology. Accordingly, various types of the display device such as a liquid crystal display ("LCD"), an organic light emitting display ("OLED") and the like have been used.

Meanwhile, a mobile electronic device includes a display unit to provide images to a user. The market share of mobile electronic devices having the same or a smaller volume or thickness and a larger display screen than those of the conventional mobile electronic devices has increased. Further, a foldable display device or a bendable display device has also been developed, which has a structure that can be folded and unfolded to provide a larger screen when used only.

SUMMARY

Aspects of the present disclosure provide a display device that is capable of stopping at a certain angle in the course of being folded or unfolded.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

An embodiment of a display device includes a display module including a first surface which displays an image and a second surface opposite to the first surface; a hinge disposed on the second surface of the display module and providing a plurality of rotation axes in a first direction; a first supporting member connected to a first side of the hinge and rotatable with respect to a first rotation axis of the plurality of rotation axes; and a second supporting member connected to a second side of the hinge and rotatable with respect to a second rotation axis of the plurality of rotation axes, where the second side is opposite the first side. Here, the hinge includes: a base frame; a first hinge pin disposed on a first side of the base frame and providing a third rotation axis of the plurality of rotation axes; a second hinge pin disposed on a second side of the base frame and providing a fourth rotation axis of the plurality of rotation axes, where the second side of the base frame is opposite the first side of the base frame; a first hinge barrel rotatably coupled to the first hinge pin; and a second hinge barrel rotatably coupled to the second hinge pin.

An embodiment of a display device includes a display module including a folding area, a first non-folding area disposed on a first side of the folding area, and a second non-folding area disposed on a second side of the folding area, where the second side is opposite the first side; a hinge disposed in the folding area and providing a plurality of rotation axes in a first direction; a first supporting member disposed in the first non-folding area and connected to the hinge and which is rotatable with respect to the folding area; and a second supporting member disposed in the second non-folding area and rotatably connected to the hinge and which is rotatable with respect to the folding area. Here, the hinge includes: a base frame; a first hinge pin and a second hinge pin disposed in the folding area; a first hinge barrel disposed across the first non-folding area and the folding area and rotatably coupled to the first hinge pin; and a second hinge barrel disposed across the second non-folding area and the folding area and rotatably coupled to the second hinge pin.

An embodiment of a display device includes a display module including a first surface which displays an image and a second surface opposite to the first surface; a hinge disposed on the second surface of the display module; and a pair of supporting members connected to sides of the hinge and rotatable with respect to a pair of first rotation axes, respectively. Here, the hinge includes: a base frame; a pair of hinge pins coupled to the base frame and providing a pair of second rotation axes, respectively, which is different from the pair of first rotation axes; and a pair of hinge barrels rotatably coupled to the pair of hinge pins, respectively.

The display device according to various embodiments can stop at a certain angle in the course of being folded or unfolded.

The effects of the present disclosure according to the invention are not limited to the aforementioned effects, and various other effects are included in the present specification.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
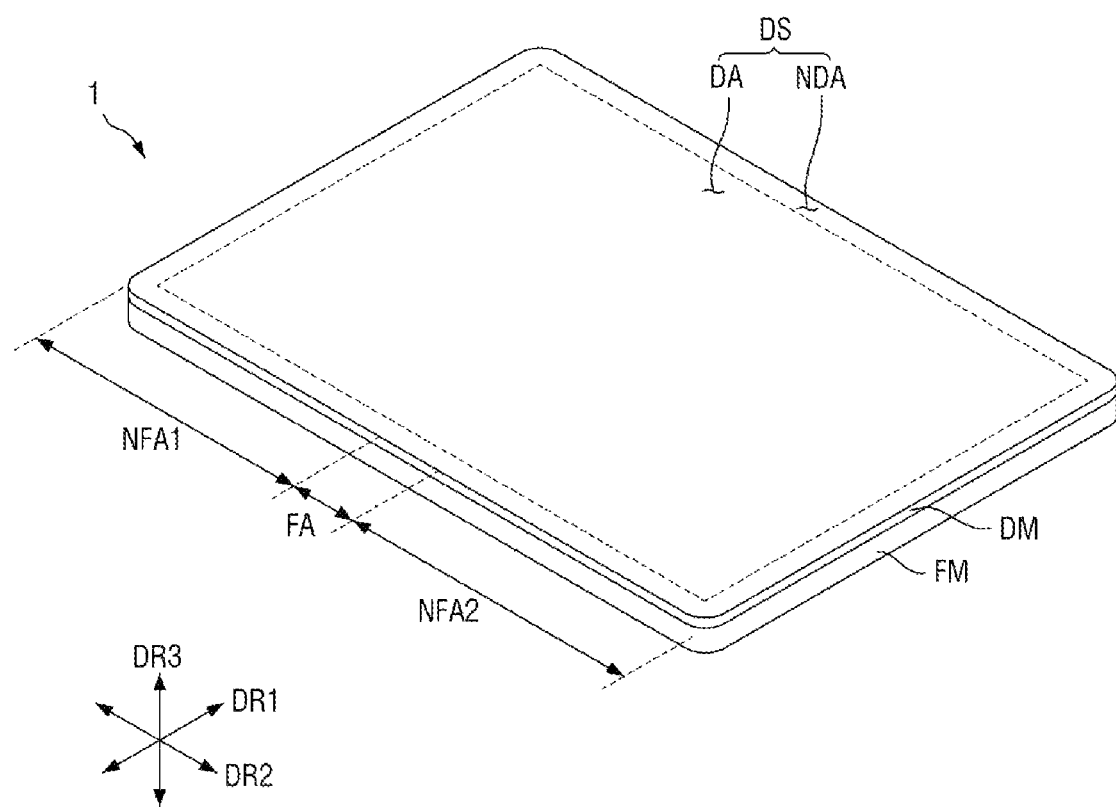
FIG. 1 is a perspective view of a display device according to an exemplary embodiment.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art. The same reference numbers indicate the same components throughout the specification. In the attached figures, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present. It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Hereinafter, exemplary embodiments will be described in detail with reference to the accompanying drawings.

Figure 2:
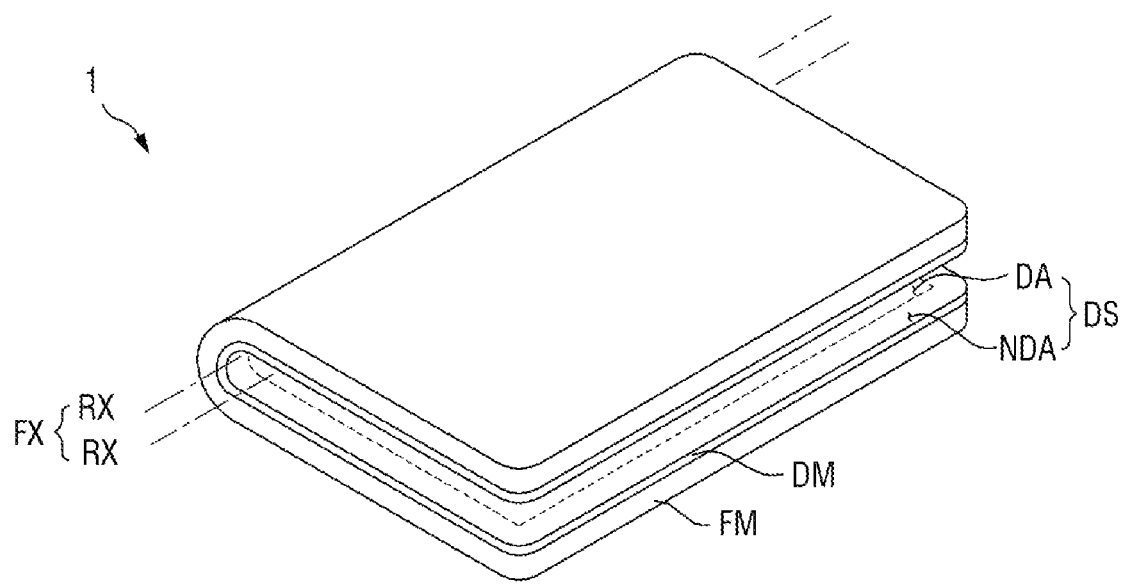
FIG. 2 is a perspective view illustrating the display device of FIG. 1 in a folded state.
Figure 2:
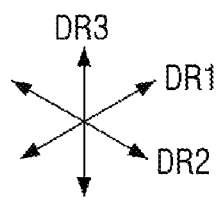
Figure 3:
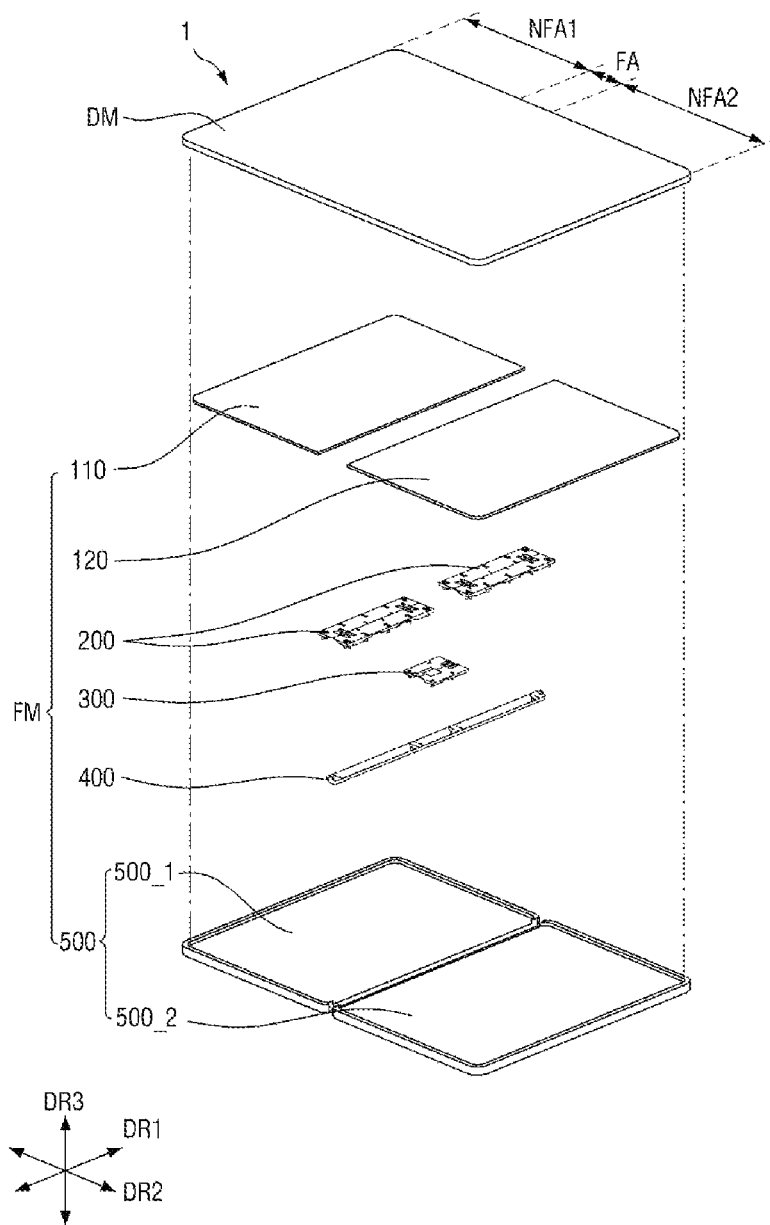
FIG. 3 is an exploded perspective view of the display device of FIG. 1.

FIG. 1 is a perspective view of a display device according to an exemplary embodiment. FIG. 2 is a perspective view illustrating the display device of FIG. 1 in a folded state. FIG. 3 is an exploded perspective view of the display device of FIG. 1.

In the present disclosure, a first direction DR1, a second direction DR2, and a third direction DR3 cross each other in different directions. The first direction DR1 may be a vertical direction, the second direction DR2 may be a horizontal direction, and the third direction D3 may be a thickness direction with respect to a plan view of the display device. The third direction DR3 may include an upward direction toward the top of FIG. 1 and a downward direction toward the bottom of FIG. 1. One surface of a member that is oriented in the upward direction may be referred to as top surface, and the other surface of the member that is oriented in the downward direction may be referred to as bottom surface. However, the above examples are just relative ones, and the directions are not limited thereto in the following embodiments.

A display device 1 according to an exemplary embodiment of the present disclosure may include various devices that display an image on a screen. Examples of the display device 1 may include, but are not limited to, a smartphone, a mobile phone, a tablet PC, a personal digital assistant ("PDA"), a portable multimedia player ("PMP"), a television, a game machine, a wristwatch-type electronic device, a head-mounted display, a monitor of a personal computer, a laptop computer, a car navigation system, a car's dashboard, a digital camera, a camcorder, an external billboard, an electronic billboard, various medical devices, various inspection devices, various household appliances such as a refrigerator and a washing machine including a display portion DPA, an Internet-of-Things device, and the like.

With reference to FIGS. 1 and 2, the display device 1 may, in a plan view of the unfolded state, have a rectangular shape with two short sides extended in the first direction DR1 and two long sides extended in the second direction DR2. However, the display device 1 according to the invention is not limited thereto and may have one of various shapes such as a square, a circle, and a diamond.

The display device 1 may include a display surface DS. The display surface DS may provide the user with a screen. At least one surface of the display device 1 may be the display surface DS. Although the display surface DS of the display device 1 may be the top surface of the display device 1 in an embodiment, the present disclosure according to the invention is not limited thereto. In some embodiments, the display surface DS of the display device 1 may include the side surfaces and/or the bottom surface of the display device 1.

The display surface DS may include a display area DA and a non-display area NDA. The display area DA is configured to display an image. The display area DA may be disposed over a first non-folding area NFA1, a second non-folding area NFA2, and a folding area FA, which will be described later. The non-display area NDA does not display an image. The non-display area NDA may be disposed around the display area DA. In one embodiment, the display area DA may be arranged on the top surface of the display device 1 in a rectangular manner, and the non-display area NDA may be arranged to surround the display area DA.

The display device 1 may include a folding area FA, a first non-folding area NFA1, and a second non-folding area NFA2. The folding area FA is an area that is folded or bent when the display device 1 is folded. The first non-folding area NFA1 and the second non-folding area NFA2 are areas that are not folded or bent even when the display device 1 is folded. Although the first non-folding area NFA1, the folding area FA, and the second non-folding area NFA2 may be arranged in order in an embodiment, the present disclosure according to the invention is not limited thereto.

The display device 1 may be a foldable device. The display device 1 may be folded or unfolded according to a state. Specifically, the display device 1 may be folded such that a portion of the display device 1 overlaps the other portion or is inclined with respect to the other portion, or the display device 1 may be unfolded to be entirely flat. Although one part of the display device 1 may be a section arranged in the first non-folding area NFA1 and the other part of the display device 1 may be a section arranged in the second non-folding area NFA2, the present disclosure according to the invention is not limited thereto. In another embodiment, the one part and/or the other part of the display device 1 may each include a portion arranged in the folding area FA.

The display device 1 may be completely folded such that the one and the other parts of the display device 1 form an angle of approximately 0 degrees)(° or 360°, partly folded such that the one and the other parts of the display device 1 form an angle in the approximate range greater than 0° and less than 180°, or unfolded such that the one and the other part of the display device 1 form an angle of approximately 180°.

The display device 1 may be in-folded. Being in-folded means that the display device 1 is folded such that the one part of the display surface DS of the display device 1 faces the other part of the display surface DS. In some embodiments, the display device 1 may be out-folded. Being out-folded means that the display device 1 is folded such that one part of the opposite surface of the display surface DS (e.g., bottom surface of the display device 1 opposite to the display surface DS) faces the other part of the opposite surface. The opposite surface may be, for example, the bottom surface of the display device. In some embodiments, the display device 1 may be in-folded and/or out-folded.

The display device 1 may have a folded state or an unfolded state. The folded state is a state where the display device 1 is bent such that one part of the display device 1 is inclined with respect to the other part. The folded state may include a first folded state and a second folded state. The first folded state may be a state where the display device 1 is partially folded. In the first folded state, the one and the other parts of the display device 1 may form an angle in an approximate range greater than 0° and less than 180° or greater than 180° and less than 360°. The second folded state may be a state where the display device 1 is completely folded. In the second folded state, the one and the other parts of the display device 1 may form an angle of approximately 0° and/or 360°. The unfolded state is a state where the display device 1 is completely unfolded such that the one and the other parts of one surface of the display device 1 are arranged to be level with each other on one plane (i.e., coplanar). In the unfolded state, the one and the other parts of the display device 1 may form an angle of approximately 180°. In one embodiment, the display device 1 may freely transition between the folded state and the unfolded state.

As to be described later, during a motion of transitioning between the folded state and the unfolded state, the display device 1 may stop the movement of the one part and/or the other part of the display device 1 at a certain angle and retain the certain angle. The certain angle may be an angle formed between the one and the other parts of the display device 1 in the folded state and/or the unfolded state.

The display device 1 may be folded or unfolded with respect to a folding axis FX. In one embodiment, the display device 1 may be folded or unfolded with respect to the folding axis FX arranged in the first direction DR1, but the present disclosure according to the invention is not limited thereto.

The folding axis FX may include a plurality of rotation axes RX. Although two rotation axes are depicted as an example in FIG. 2, the arrangement and number of the plurality of rotation axes according to the invention are not limited thereto.

As shown in FIG. 3, the display device 1 includes a display module DM and a folding member FM.

The display module DM is arranged on the display surface DS of the display device 1. The display module DM may have a rectangular shape elongated in the second direction DR2 in the unfolded state. The display module DM may be arranged over the folding member FM (to be described later).

The display module DM has flexibility. The display module DM may be folded or unfolded as the folding member FM is folded or unfolded.

The display module DM may be folded to form a curvature. In detail, the folding area FA of the display module DM may form a curvature as the display device 1 is folded. Members constituting the folding member FM (to be described later) and the plurality of rotation axes RX may be arranged symmetrically about the curvature center of the display module DM. A radius of the curvature of the folding area FA may increase as the display device 1 is unfolded and decrease as the display device 1 is folded. In one embodiment, the display module DM may have a predetermined curvature in the state of being completely folded. As to be described later, the plurality rotation axes RX may be arranged with respect to a predetermined curvature center and/or curvature radius.

The folding member FM is arranged beneath the display module DM. The folding member FM supports the display module DM. The display module DM may be folded or unfolded along with the folding member FM.

The folding member FM includes a first supporting member 110, a second supporting member 120, and a hinge 200. The folding member FM may further include a supporting bracket 300, a hinge cover 400, and a lower cover 500.

The first and second supporting members 110 and 120 are arranged beneath the display module DM. The first and second supporting members 110 and 120 may be arranged in order in the second direction DR2 on the bottom surface of the display module DM. The first and second supporting members 110 and 120 may be arranged symmetrically about the folding area FA or the folding axis FX. The first supporting member 110 may be arranged in the first non-folding area NFA1, and the second supporting member 120 may be arranged in the second non-folding area NFA2. The first supporting member 110 and/or the second supporting member 120 may partly overlap the folding area FA. The first and second supporting members 110 and 120 may be identical with or different from each other in shape and/or size. In one embodiment, the first and second supporting member 110 and 120 may have a substantially rectangular shape in a plan view. However, the shape of the first and second supporting member 110 and 120 according to the invention is not limited thereto.

The hinge 200 connects the first and second supporting members 110 and 120. The hinge 200 may be arranged to overlap the folding axis FX in the thickness direction. The hinge 200 may be arranged in the folding area FA. The hinge 200 may be arranged across the first non-folding area NFA1, the second non-folding area NFA2, and the folding area FA. There may be a plurality of hinges arranged in the first direction DR1. The hinge 200 may provide a plurality of rotation axes RX. The first and second supporting members 110 and 120 may each be connected to the hinge 200. In detail, the first supporting member 110 may be connected to one side of the hinge 200 and rotatable with respect to a first rotation axis RX1_1 (See FIG. 14), and the second supporting member 120 may be connected to the other side of the hinge 200 and rotatable with respect to a second rotation axis RX1_2 (See FIG. 14).

The supporting bracket 300 is arranged between the first and second supporting members 110 and 120. The supporting bracket 300 may be arranged between a plurality of hinges 200. The supporting bracket 300 may support a portion of the display module DM arranged between the first and second supporting members 110 and 120 and/or between the plurality of hinges 200. The supporting bracket 300 may define at least one opening.

The hinge cover 400 covers one side of the hinge 200. The hinge 200 may be placed or fixed onto the hinge cover 400. The top surface of the hinge cover 400 may have a shape concave downward to accommodate the hinge 200 (See FIG. 7).

The lower cover 500 may include a first lower cover 500_1 covering the bottom surface of the first supporting member 110 and a second lower cover 500_2 covering the bottom surface of the second supporting member 120. The first and second lower covers 500_1 and 500_2 may further cover at least part of the hinge 200 and/or hinge cover 400.

Figure 4:
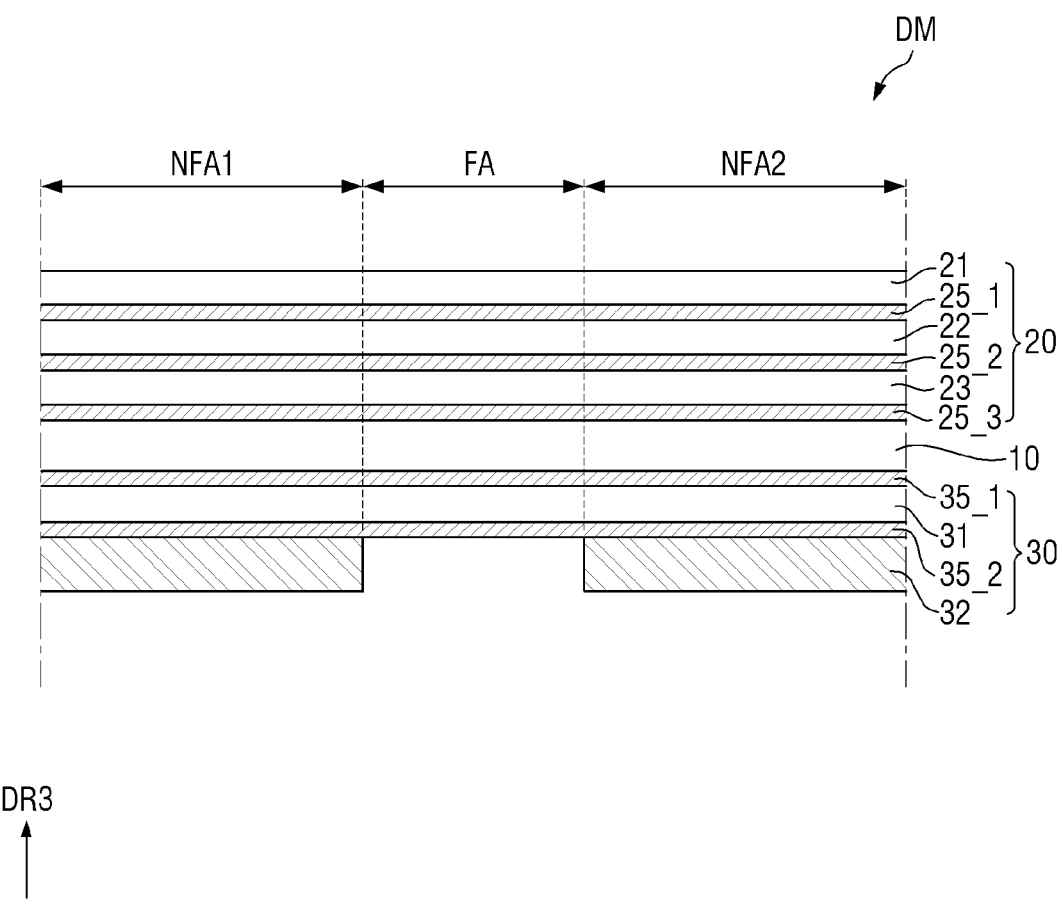
FIG. 4 is a cross-sectional view of a display module of FIG. 1.
Figure 5:
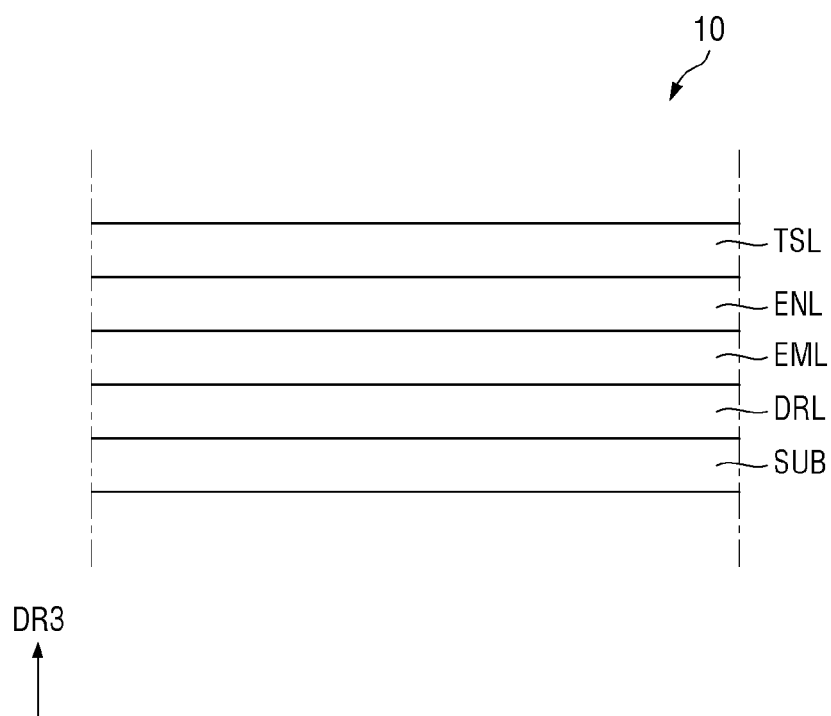
FIG. 5 is a cross-sectional view of a display panel of FIG. 4.

FIG. 4 is a cross-sectional view of a display module of FIG. 1. FIG. 5 is a cross-sectional view of a display panel of FIG. 4.

With reference to FIGS. 4 and 5, the display module DM may include a display panel 10, an upper stacked structure 20, and a lower stacked structure 30. In one embodiment, the display panel 10 may display an image in a direction toward the upper stacked structure 20. The display panel 10, the upper stacked structure 20, and the lower stacked structure 30 may be folded or unfolded as the display device 1 is folded or unfolded.

The display panel 10 is a panel for displaying a screen or an image. Examples of the display panel 10 may include not only a self-luminous display panel such as an organic light emitting display ("OLED") panel, an inorganic electroluminescence ("EL") display panel, a quantum dot ("QED") display panel, a micro-LED display panel, a nano-LED display panel, a plasma display panel ("PDP"), a field emission display ("FED") panel and a cathode ray tube ("CRT") display panel, but also a light receiving display panel such as a liquid crystal display ("LCD") panel and an electrophoretic display ("EPD") panel. Hereinafter, an organic light emitting display panel will be described as an example of the display panel 10, and the organic light emitting display panel applied to the embodiment will be simply referred to as the display panel 10 unless special distinction is required. However, the embodiment according to the invention is not limited to the organic light emitting display panel, and other display panels mentioned above or known in the art may be applied within the scope of the same technical ideas.

The display panel 10 may further include a touch member. The touch member may be provided as a panel or film separate from the display panel 10 and attached onto the display panel 10, but may also be provided in the form of a touch layer inside the display panel 10 in another embodiment. In the following embodiment, a case in which the touch member is provided inside the display panel 10 and included in the display panel 10 is illustrated, but the present disclosure according to the invention is not limited thereto.

Referring to FIGS. 4 and 5, the display panel 10 may include a substrate SUB, a circuit driving layer DRL on the substrate SUB, a light emitting layer EML on the circuit driving layer DRL, and an encapsulation layer ENL on the light emitting layer EML, and a touch layer TSL on the encapsulation layer ENL.

The substrate SUB may be a flexible substrate including a flexible polymer material such as polyimide or the like. Accordingly, the display panel 10 can be bent, folded or rolled. In some embodiments, the substrate SUB may include a plurality of sub-substrates overlapping in a thickness direction (e.g., the third direction DR3) with a barrier layer interposed therebetween. In this case, each sub-substrate may be a flexible substrate.

The circuit driving layer DRL may be disposed on the substrate SUB. The circuit driving layer DRL may include a circuit that drives the light emitting layer EML of the pixel. The circuit driving layer DRL may include a plurality of thin film transistors.

The light emitting layer EML may be disposed on the circuit driving layer DRL. The light emitting layer EML may include an organic light emitting layer. The light emitting layer EML may emit light with various luminance levels according to a driving signal transmitted from the circuit driving layer DRL.

The encapsulation layer ENL may be disposed on the light emitting layer EML. The encapsulation layer ENL may include an inorganic layer or a laminated layer of an inorganic layer and an organic layer.

The touch layer TSL may be disposed on the encapsulation layer ENL. The touch layer TSL is a layer for recognizing a touch input, and may function as a touch member. The touch layer TSL may include a plurality of sensing areas and sensing electrodes.

With reference to FIG. 4 again, the upper stacked structure 20 is arranged on the top surface of the display panel 10. The upper stacked structure 20 may include a polarization member 23, a cover window 22, and a cover window protective layer 21 that are stacked in order upward from the display panel 10.

The polarization member 23 polarizes the light passing therethrough. The polarization member 23 may serve to reduce the reflection of external light. In one embodiment, the polarization member 23 may be a polarizing film. The polarizing film may include a polarizing layer and protective substrates sandwiching the polarizing layer therebetween. The polarizing layer may include a polyvinyl alcohol film. The polarizing layer may be stretched in one direction. The stretching direction of the polarizing layer may be an absorption axis, and a direction perpendicular to the stretching direction may be a transmission axis. The protective substrates may be disposed on one surface and the other surface of the polarizing layer, respectively. The protective substrate may be made of cellulose resin such as triacetyl cellulose, polyester resin, or the like, but is not limited thereto.

A cover window 22 may be disposed on the polarization member 23. The cover window 22 serves to protect the display panel 10. The cover window 22 may include or be made of a transparent material. The cover window 22 may include, for example, glass or plastic.

When the cover window 22 includes glass, the glass may be ultra-thin glass ("UTG") or thin glass. When the glass is ultra-thin glass or thin glass, it may have a flexible property such that it can be bent, folded, or rolled. The thickness of the glass may be, for example, in the range of 10 micrometers (μm) to 300 μm, particularly, 30 μm to 80 μm or about 50 μm. The glass of the cover window 22 may include soda-lime glass, alkali aluminosilicate glass, borosilicate glass, or lithium alumina silicate glass. The glass of the cover window 22 may include chemically strengthened or thermally strengthened glass to have strong rigidity. Chemical strengthening may be achieved through an ion exchange process in alkaline salts. The ion exchange process may be performed two or more times.

If the cover window 22 includes plastic, this may serve to improve flexible characteristics such as fordable characteristic. Examples of plastics applicable to the cover window 22 may include, but are not limited to, polyimide, polyacrylate, polymethylmethacrylate ("PMMA"), polycarbonate ("PC"), polyethylenenaphthalate ("PEN"), polyvinylidene chloride, polyvinylidene difluoride ("PVDF"), polystyrene, ethylene vinylalcohol copolymer, polyethersulphone ("PES"), polyetherimide ("PEI"), polyphenylene sulfide ("PPS"), polyarylate ("PAR"), triacetyl cellulose ("TAC"), and cellulose acetate propionate ("CAP"). The plastic cover window 22 may be formed to include one or more of the plastic materials mentioned above.

The cover window protective layer 21 may be disposed on the cover window 22. The cover window protective layer 21 may perform at least one of functions of prevention of scattering, impact absorption, prevention of scratch, prevention of fingerprint smudges and prevention of glare on the cover window 22. The cover window protective layer 21 may be formed to include a transparent polymer film. The transparent polymer film includes at least one of polyethylene terephthalate ("PET"), polyethylene naphthalate (PEN), polyether sulfone (PES), polyimide ("PI"), polyarylate (PAR), polycarbonate (PC), polymethyl methacrylate (PMMA), or cycloolefin copolymer ("COC").

The upper stacked structure 20 may include upper bonding members 25_1, 25_2, and 25_3 for bonding adjacently stacked members. For example, a first bonding member 25_1 may be disposed between the cover window protective layer 21 and the cover window 22 to bond them, a second bonding member 25_2 may be disposed between the cover window 22 and the polarization member 23 to bond them. A third bonding member 25_3 may be disposed between the polarization member 23 and the display panel 10 to bond them. That is, the upper bonding members 25_1, 25_2, and 25_3 may be members that attach the layers to one surface of the display panel 10. The first bonding member 25_1 may be a protective layer bonding member for attaching the cover window protective layer 21, the second bonding member 25_2 may be a window bonding member for attaching the cover window 22, and the third bonding member 25_3 may be a polarizing portion bonding member for attaching the polarization member 23. All of the upper bonding members 25_1, 25_2, and 25_3 may be optically transparent.

The lower stacked structure 30 is arranged under the display panel 10. The lower stacked structure 30 may include a polymer film layer 31 and a heat dissipation member 32 stacked in order downward from the display panel 10.

The polymer film layer 31 may include a polymer film. The polymer film layer 31 may include, for example, polyimide (PI), polyethylene terephthalate (PET), polycarbonate (PC), polyethylene ("PE"), polypropylene ("PP"), polysulfone ("PSF"), polymethylmethacrylate (PMMA), tri acetylcellulose (TAC), cycloolefin polymer ("COP") or the like. The polymer film layer 31 may include a functional layer on at least one surface thereof. The functional layer may include, for example, a light absorbing layer. The light absorbing layer may include a light absorbing material such as a black pigment or dye. The light absorbing layer may be formed by coating or printing black ink on a polymer film.

The heat dissipation member 32 may be disposed under the polymer film layer 31. The heat dissipation member 32 serves to diffuse heat generated from the display panel 10 or other components of the display device 1. The heat dissipation member 32 may be a heat dissipation sheet including graphite, carbon nanotubes or the like. In one embodiment, the heat dissipation members 32 may be separated by the folding area FA to facilitate folding of the display device 1 as illustrated in FIGS. 3 and 4. In some embodiments, the heat dissipation members 32 may be connected as one body.

The lower stacked structure 30 may include lower bonding members 35_1 and 35_2 for bonding adjacently stacked members. For example, a fourth bonding member 35_1 may be disposed between the display panel 10 and the polymer film layer 31 to bond them, and a fifth bonding member 35_2 may be disposed between the polymer film layer 31 and the heat dissipation member 32 to bond them.

In some embodiments, the lower stacked structure 30 may further include a buffer member. The buffer member may be disposed, for example, between the polymer film layer 31 and the heat dissipation member 32.

Figure 6:
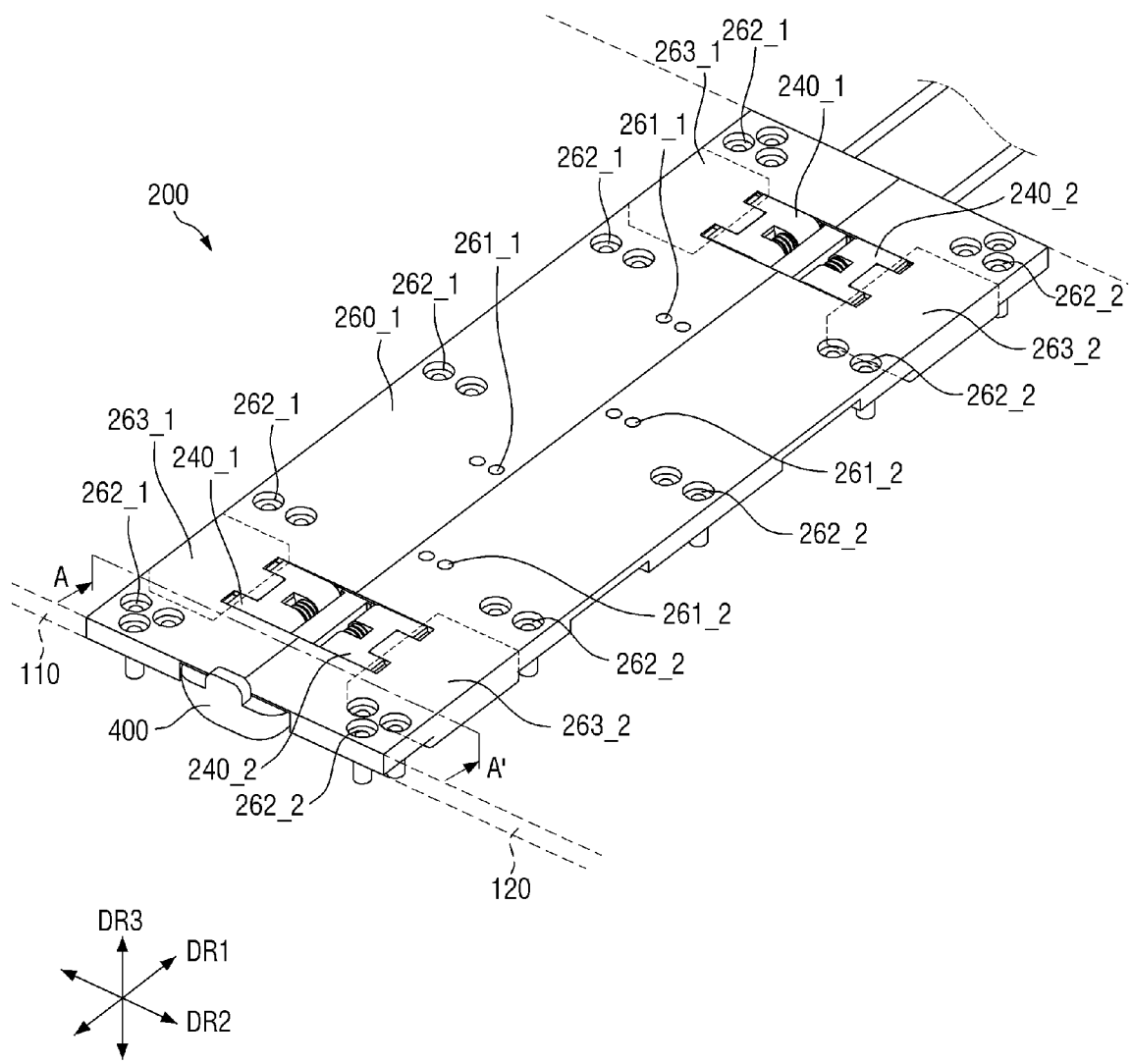
FIG. 6 is a perspective view of a hinge of FIG. 1.
Figure 7:
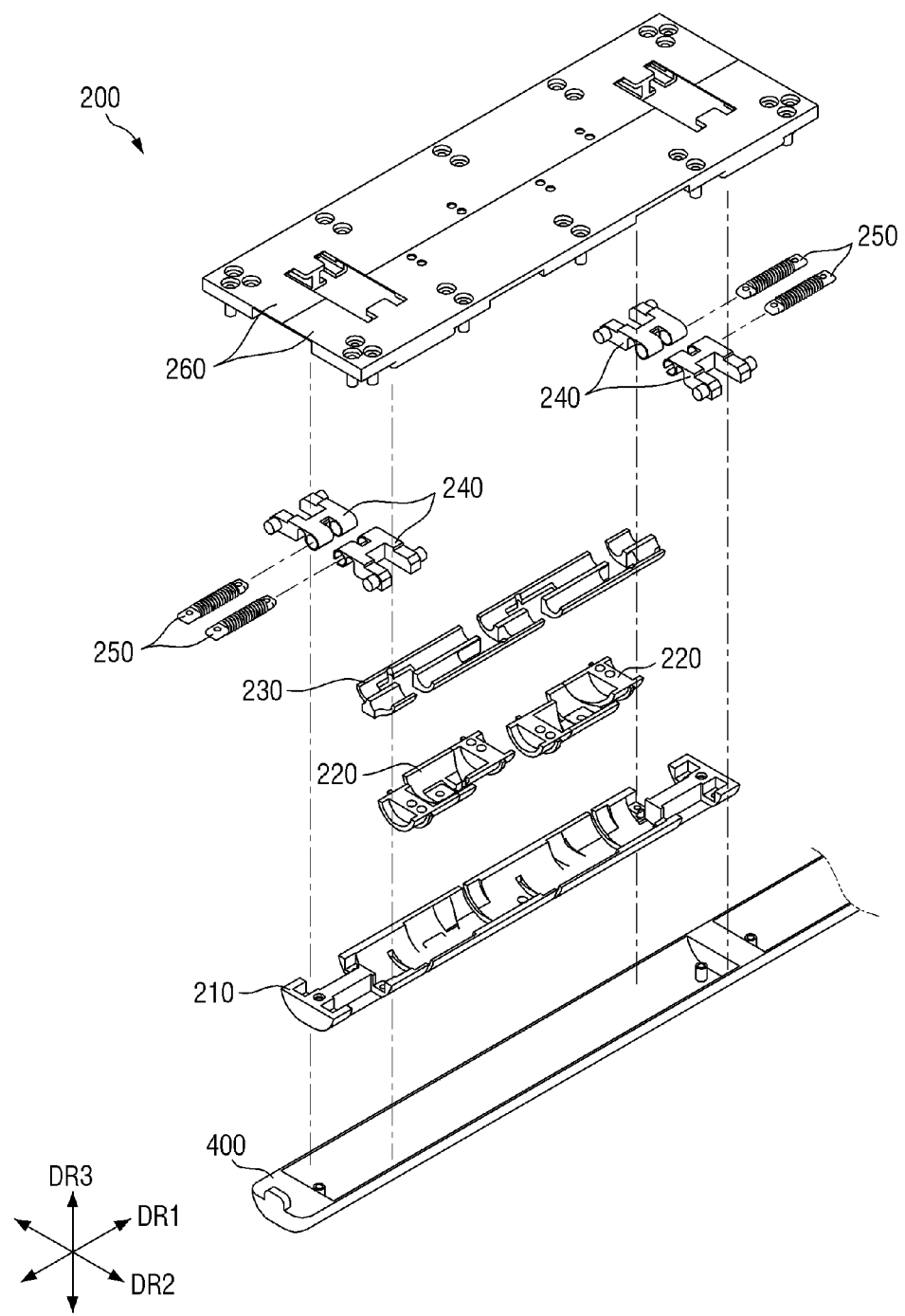
FIG. 7 is an exploded perspective view of the hinge of FIG. 6.
Figure 8:
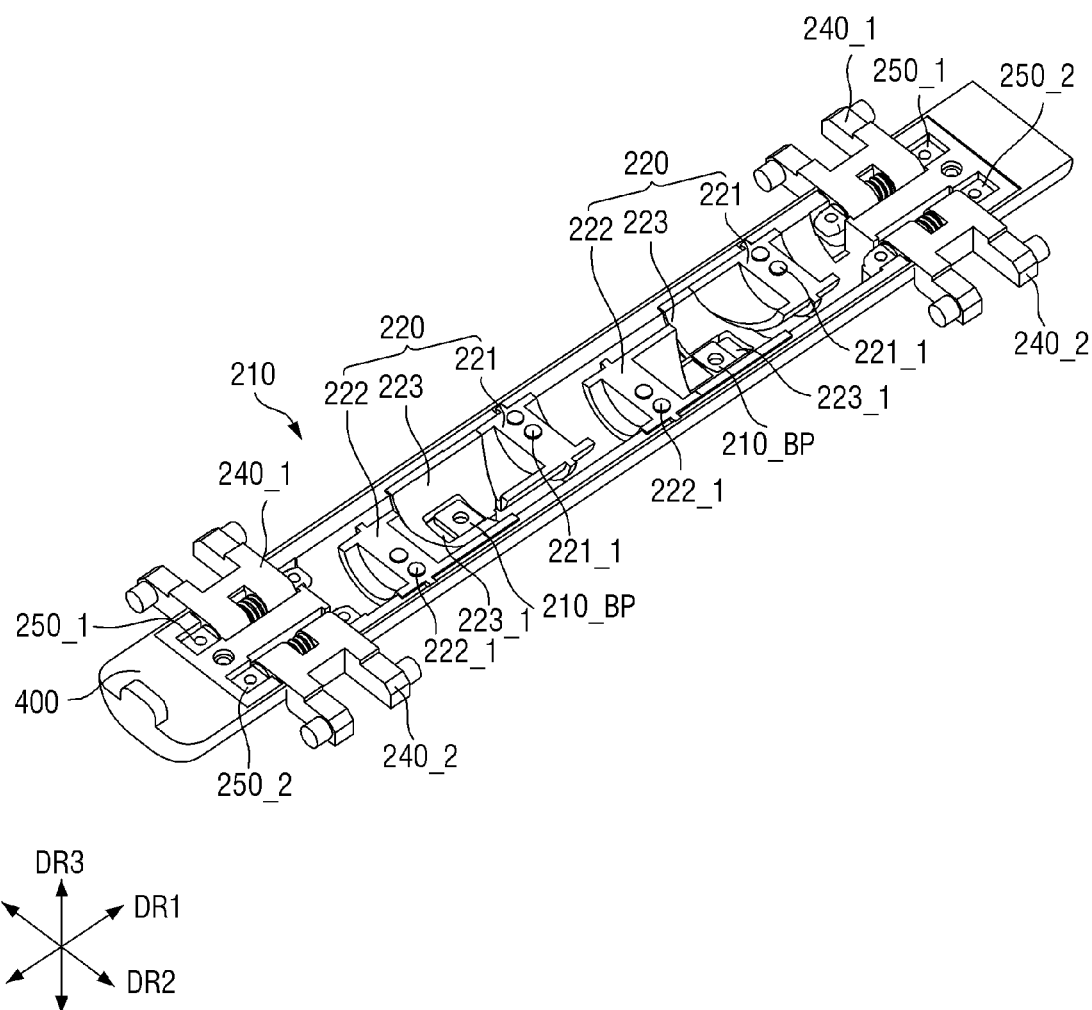
FIG. 8 is a perspective view of the hinge of FIG. 6 with exclusion of a rotor bracket and a connection bracket.

FIG. 6 is a perspective view of a hinge of FIG. 1. FIG. 7 is an exploded perspective view of the hinge of FIG. 6. FIG. 8 is a perspective view of the hinge of FIG. 6 with exclusion of a rotor bracket and a connection bracket.

With reference to FIGS. 1 to 3 and 6 to 8, the hinge 200 may include a base frame 210, a hinge barrel 240, and a hinge pin 250. The hinge 200 may further include a plurality of cams 220, a rotor bracket 230, and a connection bracket 260.

The base frame 210 may have a rod shape elongated in the first direction DR1 in a plan view. The top surface of the base frame 210 includes a plurality of indented parts for receipt and/or engagement with other members. The top surface and/or bottom surface of the base frame 210 may have a curvature convex downward. The base frame 210 may receive a first hinge barrel 240_1, a second hinge barrel 240_2, a first hinge pin 250_1, a second hinge pin 250_2, a plurality of cams 220, and/or the rotor bracket 230. The base frame 210 may include at least one groove and/or at least one guide surface for guiding the plurality of cams 220. The at least one guide surface may be at least part of the top surface of the base frame 210.

The hinge barrel 240 may include the first hinge barrel 240_1 and the second hinge barrel 240_2. A pair of the first hinge barrel 240_1 and the second hinge barrel 240_2 is arranged at one side of the base frame 210, and another pair of first hinge barrel 240_1 and the second hinge barrel 240_2 is arranged at the other side of the base frame 210. In detail, the first hinge barrel 240_1 may be arranged at one side of the base frame 210 close to the first supporting member 110, and the second hinge barrel 240_2 may be arranged at the other side of the base frame 210 close to the second supporting member 120. With reference to FIGS. 3, 6, and 7, the first and second hinge barrels 240_1 and 240_2 may be arranged symmetrically with respect to the base frame 210 or the folding axis FX. The first and second hinge barrels 240_1 and 240_2 may be arranged to rotate in opposite directions. The first and second hinge barrels 240_1 and 240_2 may be engaged to rotate about the first and second hinge pins 250_1 and 250_2 (to be described later) with respect to the base frame 210, respectively. It may also be possible that a plurality of first and second hinge barrels 240_1 and 240_2 is arranged. In one embodiment, two first hinge barrels 240_1 may be arranged at one side of the base frame 210, and two second hinge barrels 240_2 may be arranged at the other side of the base frame 210. Although the first and second hinge barrels 240_1 and 240_2 may each have a shape of a cuboid block with an indentation in an embodiment, the present disclosure according to the invention is not limited thereto.

The hinge pin 250 may include the first hinge pin 250_1 and the second hinge pin 250_2. The first and second hinge pins 250_1 and 250_2 are inserted into the first and second hinge barrels 240_1 and 240_2, respectively. The first and second hinge pins 250_1 and 250_2 may be placed and fixed on the top surface of the base frame 210. In detail, the first and second hinge pins 250_1 and 250_2 may be received into parts of the base frame 210, recessed downward by a predetermined depth from the top surface thereof. It may also be possible that a plurality of first and second hinge pins 250_1 and 250_2 is arranged. In one embodiment, two first hinge pins 250_1 are arranged at one side of the base frame 210, and two second hinge pins 250_2 are arranged at the other side of the base frame 210.

The plurality of cams 220 are placed on the top surface of the base frame 210. In detail, the plurality of cams 220 may be slidably placed in parts of the base frame 210, recessed downward from the top surface thereof to allow rotational and/or linear motions of the respective cams 200. The plurality of cams 220 may each have a semi-circular cross-section. In one embodiment, the bottom surfaces of the plurality of cams 220 may include convex surfaces, respective, the top surface of the base frame 210 may include concave surfaces corresponding to the convex surfaces, and the rotational and/or linear motions of the plurality of cams 220 may be guided by the convex and concave surfaces.

The plurality of cams 220 may include a first rotor cam 221, a second rotor cam 222, and a slide cam 223.

The first and second rotor cams 221 and 222 may connect to first and second connection brackets 260_1 and 260_2 (to be described later), respectively. The first and second rotor cams 221 and 222 may have convex surfaces facing the top surface of the base frame 210 and flat surfaces connecting one and the other ends of the convex surfaces at the upper parts thereof. In one embodiment, the first and second rotor cams 221 and 222 may include at least one connection protrusion 221_1 and 222_1 protruded upward from the flat surface thereof, respectively. The connection protrusion 221_1 of the first rotor cam 221 is engaged with the rotor connection hole 261_1 of the first connection bracket 260_1, and the connection protrusion 222_1 of the second rotor cam 222 may be engaged with the rotor connection hole 261_2 of the second connection bracket 260_2.

The slide cam 223 is arranged between the first and second rotor cams 221 and 222. The slide cam 223 may be arranged on the top surface of the base frame 210 and include a guide hole 223_1 engaged with a guide bump 210_BP protruded upward.

In one embodiment, the first rotor cam 221, the second rotor cam 222, and the slide cam 223 may each be a negative end cam. In the case where the display device 1 is folded or unfolded, the first rotor cam 221 may perform a rotational motion in a first rotation direction, the second rotor cam 222 may perform a rotational motion in a second rotation direction, and the slide cam 223 may perform a linear motion in the first direction DR1. Here, the first rotation direction and the second rotation direction are opposite rotational directions from each other. The slide cam 223 may transfer the rotation of the first rotor cam 221 to the second rotor cam 222 and transfer the rotation of the second rotor cam 222 to the first rotor cam 221 such that the first and second supporting members 110 and 120 are evenly folded or unfolded.

The rotor bracket 230 covers at least part of the plurality of cams 220. In one embodiment, the rotor bracket 230 may cover the slide cam 223 in whole and the first and second rotor cams 221 and 222 in part. The rotor bracket 230 may guide the rotational motion and/or linear motion of the plurality of cams 220.

The connection bracket 260 may include the first connection bracket 260_1 and the second connection bracket 260_2. The first and second connection brackets 260_1 and 260_2 are arranged symmetrically with respect to the base frame 210 and/or the folding axis FX. The first connection bracket 260_1 may be arranged at one side of the base frame 210, and the second connection bracket 260_2 may be arranged at the other side of the base frame 210. The first connection bracket 260_1 may connect the first rotor cam 221 and the first supporting member 110, and the second connection bracket 260_2 may connect the second rotor cam 222 and the second supporting member 120. The first and second connection brackets 260_1 and 260_2 may rotate in opposite directions. The first and second connection brackets 260_1 and 260_2 may be arranged to cover at least one of the base frame 210, the plurality of cams 220, the rotor bracket 230, the first hinge pin 250_1, and the second hinge pin 250_2. The first and second connection brackets 260_1 and 260_2 may expose at least part of the first and second hinge barrels 240_1 and 240_2, respectively. Although the first and second connection brackets 260_1 and 260_2 may have a cuboid shape elongated in the first direction DR1 in an embodiment, the present disclosure according to the invention is not limited thereto.

Hereinafter, detailed descriptions are made regarding the first and second hinge barrels 240_1 and 240_2 and the first and second hinge pins 250_1 and 250_2 with reference to FIGS. 9 and 10.

Figure 9:
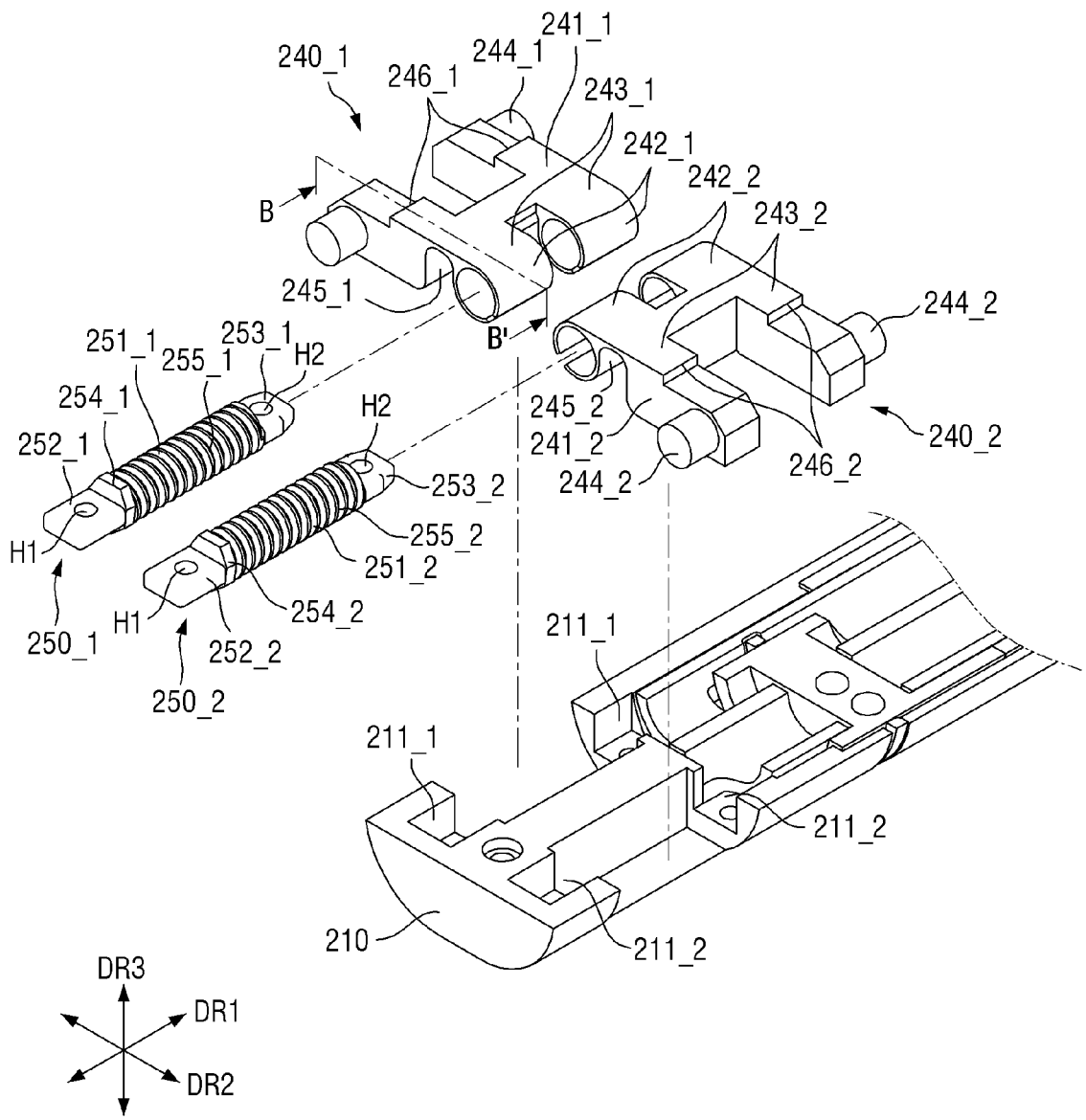
FIG. 9 is an exploded perspective view of first and second hinge barrels and first and second hinge pins of FIG. 6.

FIG. 9 is an exploded perspective view of first and second hinge barrels and first and second hinge pins of FIG. 6.

With reference to FIGS. 1 to 3 and 6 to 10, the first and second hinge barrels 240_1 and 240_2 may include respective body parts 241_1 and 241_2, respective barrel parts 242_1 and 242_2, and respective sliding poles 244_1 and 244_2. The first and second hinge barrels 240_1 and 240_2 may further include respective connection parts 243_1 and 243_2, respective hinge cover-receiving grooves 245_1 and 245_2, and respective stepped parts 246_1 and 246_2.

The first and second hinge barrels 240_1 and 240_2 may be substantially identical with or similar to each other in structure. Hereinafter, the description is mainly directed to the first hinge barrel 240_1 as an example.

The body part 241_1 constitutes the body of the first hinge barrel 240_1. At least part of the body part 241_1 may be slidably inserted into the hinge barrel receiving part 263_1 of the first connection bracket 260_1. The insertion depth of the body part 241_1 inside the hinge barrel receiving part 263_1 may vary according to an angle between the first and second supporting members 110 and 120 (See FIGS. 13 to 15). The body part 241_1 may include a pair of branches split off in the direction toward the first supporting member 110. A pair of sliding poles 244_1 may be arranged for the pair of branches, respectively. The body part 241_1 may have a recess portion recessed toward the base frame 210 between the paired branches to receive a guide wall GL (See FIG. 12) of the hinge barrel receiving part 263_1 of the first connection bracket 260_1 (to be described later).

The barrel part 242_1 is arranged, close to the base frame 210, at one side of the body part 241_1. The first hinge pin 250_1 may be inserted into the barrel part 242_1. In one embodiment, a plurality of barrel parts 242_1 may be arranged in the first direction DR1. In some embodiments, one barrel part 242_1 may be arranged. Hereinafter, detailed description is made regarding the barrel part 242_1 with reference to FIGS. 10A to 10C.

The sliding pole 244_1 may be arranged to protrude from the body part 241_1. In detail, the sliding poles 244_1 may be composed of two paired parts that are arranged at one and the other sides of the body part 241_1. The sliding pole 244_1 may be slidably received in the hinge barrel receiving part 263_1 of the first connection bracket 260_1 (to be described later). A part of the sliding pole 244_1 that contacts the first connection bracket 260_1 may have a curved surface. For example, the sliding pole 244_1 may have a cylindrical shape. Accordingly, the first hinge barrel 240_1 may be arranged to be inclined with respect to the first connection bracket 260_1 when the display device 1 is folded or unfolded, as to be described with reference to FIG. 14. In some embodiments, the first hinge barrel 240_1 may be arranged in parallel with the first connection bracket 260_1 when the display device 1 is folded or unfolded.

The connection part 243_1 connects one side of the body part 241_1 and one side of the barrel part 242_1. The thickness of the connection part 243_1 may be less than each of the thickness of the body part 241_1 and the barrel part 242_1.

The hinge cover-receiving groove 245_1 is provided beneath the connection part 243_1. The hinge cover-receiving groove 245_1 may be defined to be recessed upward. The hinge cover-receiving groove 245_1 may prevent the hinge cover 400 and the first hinge barrel 240_1 from interfering with each other during the folding or unfolding motion of the display device 1.

The stepped part 246_1 is provided on top of the body part 241_1. The stepped part 246_1 may be slidably received in the upper recess 263_G_1 of the first connection bracket 260_1 (to be described later). The insertion depth of the first hinge barrel 240_1 inside the hinge barrel receiving part 263_1 may be limited depending on the condition whether the stepped part 246_1 contacts or is separated from a part of the first connection bracket 260_1 that defines the upper recess 263_G_1.

The first and second hinge pins 250_1 and 250_2 may include respective cylindrical parts 251_1 and 251_2, respective head parts 252_1 and 252_2, and respective tail parts 253_1 and 253_2. The first and second hinge pins 250_1 and 250_2 may further include respective locking parts 254_1 and 254_2 and respective oil grooves 255_1 and 255_2.

The first and second hinge pins 250_1 and 250_2 may be substantially identical with or similar to each other in structure. Hereinafter, the description is mainly directed to the first hinge pin 250_1.

The first cylindrical part 251_1 is arranged in the first direction DR1. The cylindrical part 251_1 provides a rotation axis in the first direction DR1. At least part of the cylindrical part 251_1 may be inserted into the barrel part 242_1 of the first hinge barrel 240_1.

The head part 252_1 is arranged at one end of the cylindrical part 251_1. The head part 252_1 may have a flat rectangular parallelepiped shape. The head part 252_1 may define a first connection hole H1.

The tail part 253_1 is arranged at the other end of the cylindrical part 251_1. The tail part 253_1 may penetrate the barrel part 242_1. The tail part 253_1 may be smaller in size than the head part 252_1. The tail part 253_1 may have a wedge shape, by way of example, tapering in width toward one end. The tail part 253_1 may define a second connection hole H2.

The locking part 254_1 is arranged between the head part 252_1 and the cylindrical part 251_1. The locking part 254_1 may limit the insertion depth of the first hinge pin 250_1 inside the barrel part 242_1. The locking part 254_1 may be greater in radius than each of the head part 252_1, the tail part 253_1, and the cylindrical part 251_1. The locking part 254_1 may have a radius greater than that of the curvature of a concave surface formed by a first curvature part 242_1_1 and a second curvature part 242_1_2 of the barrel part 242_1 (to be described later).

The oil groove 255_1 may be defined in a circumferential direction on the outer circumferential surface of the cylindrical part 251_1 in a recessed manner. A plurality of oil grooves 255_1 may be defined on the outer circumferential surface of the cylindrical part 251_1.

Hereinafter, detailed descriptions are made of the shape of the barrel part 242_1 and the connection relationship between the first hinge barrel 240_1 and the first hinge pin 250_1.

Figure 10A:
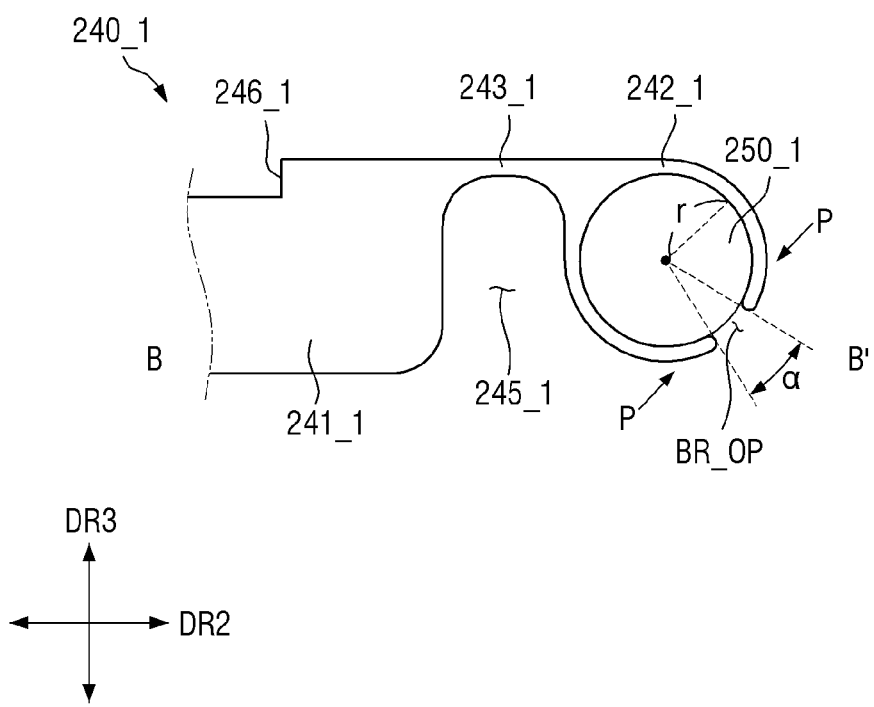
FIG. 10A shows a cross-sectional view of a first hinge barrel of FIG. 9, and FIGS. 10B and 10C show plan views of a first hinge barrel of FIG. 9.
Figure 10B:
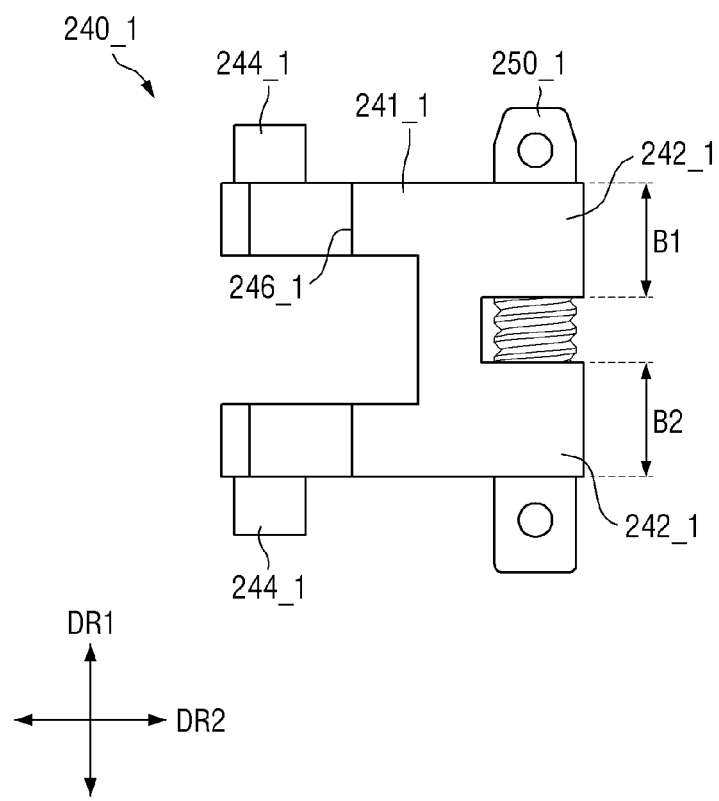
Figure 10C:
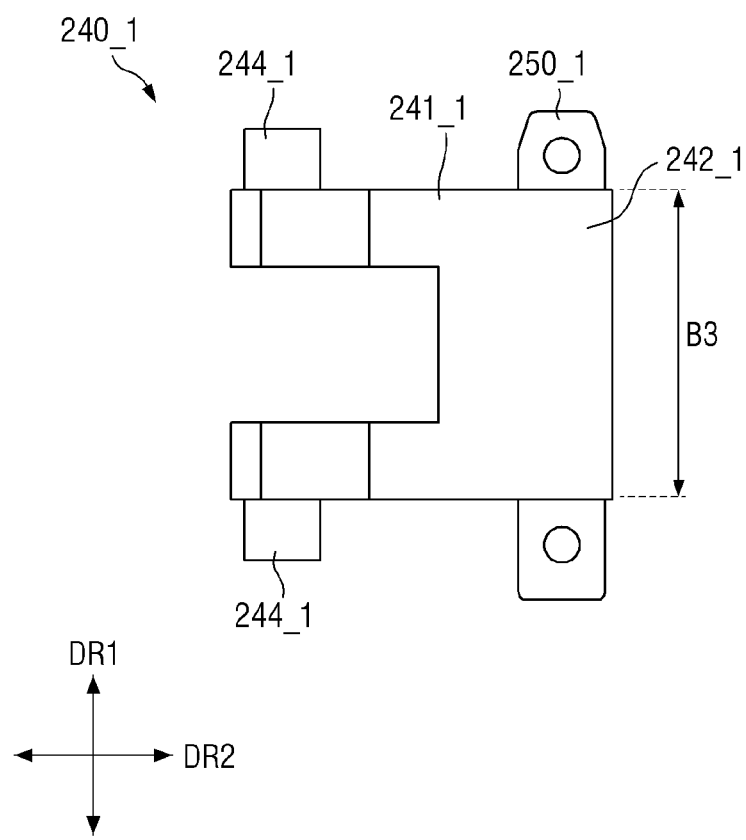

FIGS. 10A to 10C show a cross-sectional view and plan views of a first hinge barrel of FIG. 9.

FIG. 10A is a cross-sectional view of the first hinge barrel 240_1 taken along line B-B'. FIG. 10B is a plan view of the first hinge barrel 240_1. FIG. 10C is a plan view of the first hinge barrel 240_1 according to another embodiment.

With reference to FIG. 9 and FIG. 10A, one side of the barrel part 242_1 may be connected to the connection part 243_1. The other end of the barrel part 242_1 opposite to the one end of the barrel part 242_1 may be hollowed with respect to the curvature center of the barrel part 242_1 or the first hinge pin 250_1. In detail, at one side of the barrel part 242_1, a slit or an opening is defined to extend in a direction of insertion (i.e., the first direction DR1) of the first hinge pin 250_1. Accordingly, the barrel part 242_1 may have a C-shaped cross-section.

The barrel part 242_1 may include the first curvature part 242_1_1 and the second curvature part 242_1_2.

The first and second curvature parts 242_1_1 and 242_1_2 may each have a predetermined width in the first direction DR1 to surround at least part of the outer circumferential surface of the cylindrical part 251_1. The surfaces of the first and second curvature parts 242_1_1 and 242_1_2 that face the cylindrical part 251_1 of the first hinge pin 250_1 may be connected to each other to form a concave surface contacting at least part of the outer circumferential surface of the cylindrical part 251_1. The first and second curvature parts 242_1_1 and 242_1_2 may each be connected, at one side thereof, to the connection part 243_1, and may be separated, at the other sides thereof, by a predetermined distance. Accordingly, a slit-shaped opening BR_OP extending in the first direction DR1 may be defined at one side of the barrel part 242_1. In cross-sectional view (See FIG. 10A), the hollow of the barrel part 242_1 may communicate with the outside through the opening BR_OP such that part of the outer circumferential surface of the first hinge pin 250_1 inserted into the barrel part 242_1 is exposed to the outside.

The first hinge pin 250_1 may be inserted into the barrel part 242_1 of the first hinge barrel 240_1 in an interference fit manner. In detail, the first hinge pin 250_1 may be greater in radius than the first hinge barrel 240_1. Accordingly, in the case where the first hinge pin 250_1 is inserted into the first hinge barrel 240_1 in a press-fit manner, the barrel part 242_1 of the first hinge barrel 240_1 may be elastically deformed, and a restoration force P caused by the elastic deformation may produce a predetermined friction force between the cylindrical part 251_1 of the first hinge pin 250_1 and the barrel part 242_1 of the first hinge barrel 240_1. The predetermined friction force may produce a friction torque when the display device 1 is folded or unfolded. The size of the torque for folding or unfolding the display device 1 may be determined by the friction torque. That is, the display device 1 may stop the folding or unfolding motion thereof at a certain angle, and retain the certain angle. In one embodiment, the first hinge barrel 240_1 and the first hinge pin 250_1 may be made of a metal material, and the surfaces of the barrel part 242_1 and the cylindrical part 251_1 may be heat-treated to improve the hardness and wear resistance.

With reference to FIGS. 10A and 10B, the friction torque may be determined by at least one of the thickness of the first curvature part 242_1_1, the thickness of the second curvature part 242_1_2, widths B1 and B2 of the barrel part 242_1, a radius r of the barrel part 242_1, a difference between the radius of the barrel part 242_1 before insertion of the cylindrical part 251_1 and the radius of the cylindrical part 251_1, or an angle α at which the opening BR_OP is defined with respective to the center of the curvature of the barrel part 242_1 or cylindrical part 251_1.

With reference to FIG. 10B, a plurality of barrel parts 242_1 may be arranged to adjust the total width of the barrel parts 242_1 through which the cylindrical part 251_1 is inserted. The total width of the barrel parts 242_1 may be the sum of the first width B1 of one side barrel part 242_1 and the second width B2 of the other side barrel part 242_1. That is, the barrel parts 242_1 may define a recessed portion that makes it possible to adjust the total width of the barrel parts 242_1, leading to adjustment of the amount of friction torque. The first and second widths B1 and B2 may be equal or unequal to each other.

With reference to FIG. 10C, one barrel part 242_1 may be provided unlike the embodiment of FIG. 10B. The barrel part 242_1 according to the embodiment of FIG. 10C may produce a friction torque greater than that of the barrel part_242_1 of the embodiment of FIG. 10B because a width B3 of the barrel part 242_1 is wider than a sum of the widths B1 and B2 of the barrel part 242_1 in FIG. 10B, Hereinafter, detailed descriptions are made of the first and second connection brackets 260_1 and 260_2 with reference to FIGS. 11 and 12.

Figure 11:
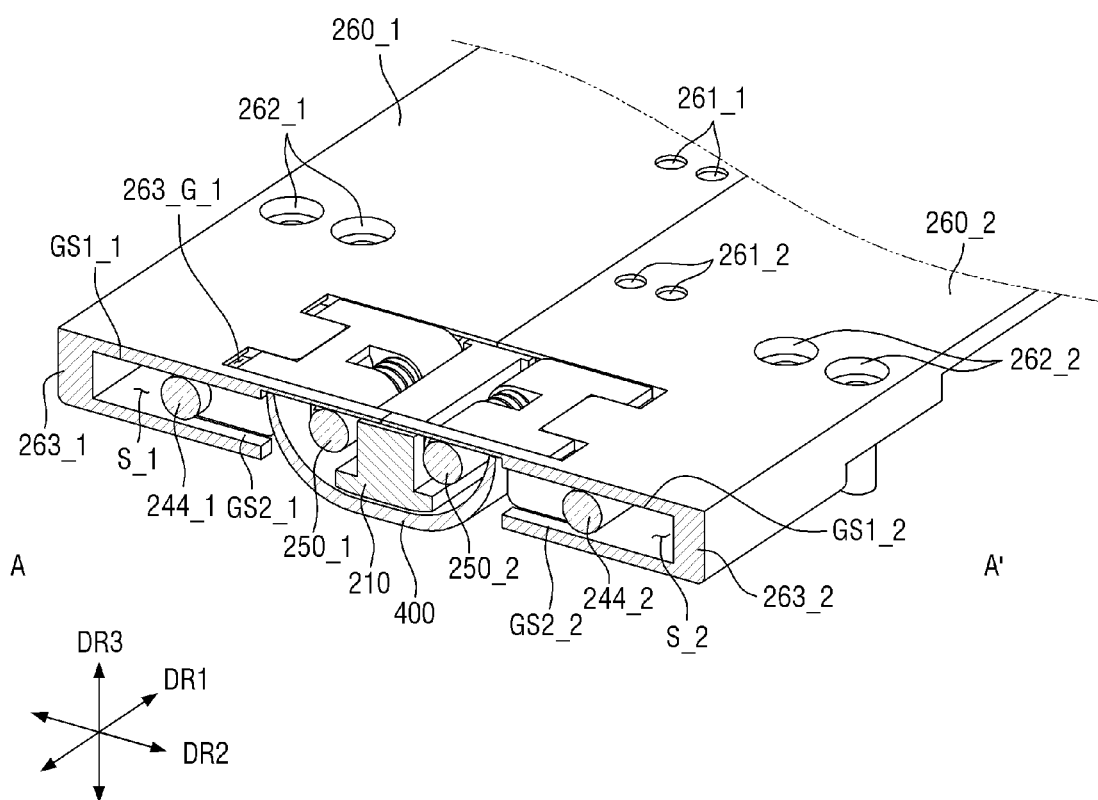
FIG. 11 is a perspective cross-sectional view taken along line A-A' of FIG. 6.
Figure 12:
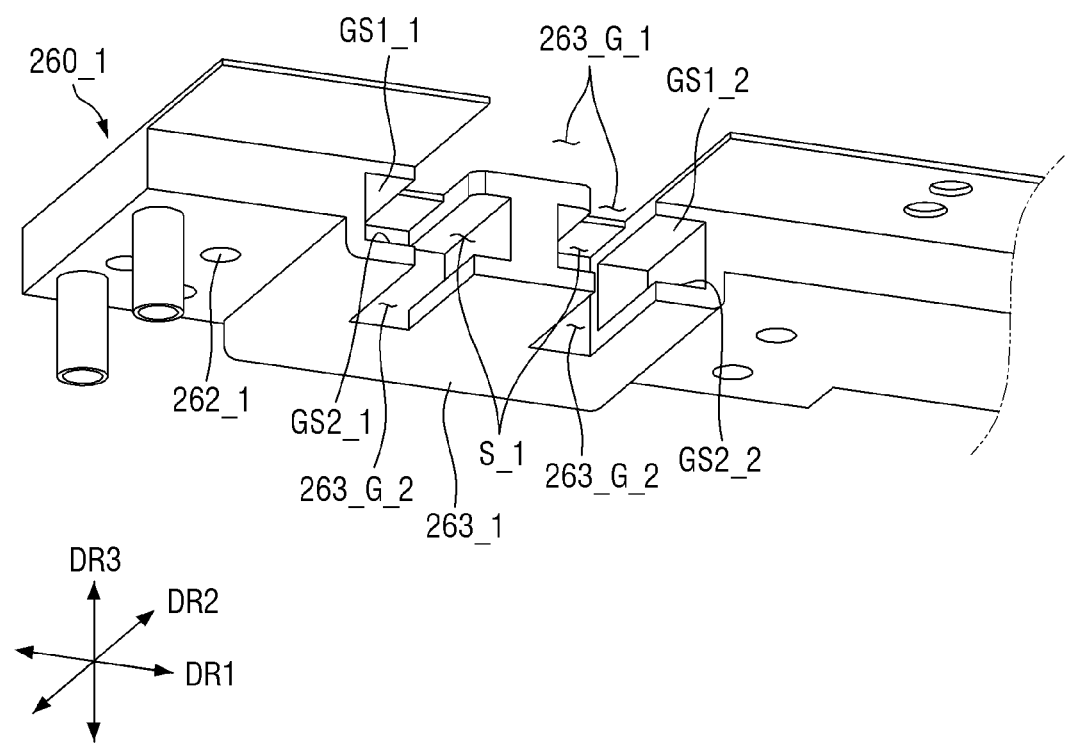
FIG. 12 is an enlarged perspective view of a hinge barrel receiving part of a first connection bracket of FIG. 6.

FIG. 11 is a perspective cross-sectional view taken along line A-A' of FIG. 6. FIG. 12 is an enlarged perspective view of a hinge barrel receiving part of a first connection bracket of FIG. 6.

With reference to FIGS. 6, 11, and 12, the first and second connection brackets 260_1 and 260_2 may include base plates BT_1 and BT_2, the rotor connection holes 261_1 and 261_2, supporting member connection holes 262_1 and 262_2, and the hinge barrel receiving parts 263_1 and 263_2, respectively.

Because the first and second connection brackets 260_1 and 260_2 are substantially identical with or similar to each other, the description is mainly directed to the first connection bracket 260_1.

The base plate BT_1 may have, but is not limited to, a rectangular shape in a plan view.

The rotor connection holes 261_1 is defined to penetrate the base plate BT_1. The rotor connection hole 261_1 of the first connection bracket 260_1 may receive the connection protrusion 221_1 of the first rotor cam 221, and the rotor connection hole 261_2 of the second connection bracket 260_2 may receive the connection protrusion 222_1 of the second rotor cam 222.

The supporting member connection hole 262_1 is defined to penetrate the base plate BT_1. Although not shown in the drawings, the supporting member connection hole 262_1 of the first connection bracket 260_1 may receive a connection member such as a bolt for connection to the first supporting member 110, and the supporting member connection hole 262_2 of the second connection bracket 260_2 may receive a connection member such as a bolt for connection to the second supporting member 120.

The hinge barrel receiving part 263_1 is arranged beneath the base plate BT_1. The hinge barrel receiving part 263_1 may slidably receive at least part of the first hinge barrel 240_1 in a pocket-shaped inner space.

The hinge barrel receiving part 263_1 may include the upper recess 263_G_1, a lower recess 263_G_2, and a slot S_1.

The upper recess 263_G_1 is arranged at the upper part of the hinge barrel receiving part 263_1. The upper recess 263_G_1 may be defined to be recessed in a direction from a side edge, close to the base frame 210, of the base plate BT_1 to the other edge at which the first supporting member 110 is arranged. The upper recess 263_G_1 may receive the upper part of the first hinge barrel 240_1. In detail, the upper recess 263_G_1 may receive the stepped part 246_1 of the first hinge barrel 240_1. The stepped part 246_1 of the first hinge barrel 240_1 may be caught in the upper recess 263_G_1 to limit the insertion depth of the first hinge barrel 240_1.

The lower recess 263_G_2 is arranged at the lower part of the hinge barrel receiving part 263_1. The lower recess 263_G_2 may be defined to recessed in a direction from a side edge, close to the base frame 210, of the lower part of the hinge barrel receiving part 263_1 to the other side at which the first supporting member 110 is arranged. The lower recess 263_G_2 may prevent any interference between the first hinge barrel 240_1 and the lower part of the hinge barrel receiving part 263_1 while the display device 1 is folded or unfolded.

The slot S_1 is arranged toward the base frame 210. The slot S_1 may slidably receive at least part of the first hinge barrel 240_1. The sliding pole 244_1 of the first hinge barrel 240_1 may slide between a top surface GS1_1 and a bottom surface GS2_1 of the slot S_1 extending in the second direction DR2 as the display device 1 is folded or unfolded. In one embodiment, the slot S_1 may be arranged between the upper recess 263_G_1 and the lower recess 263_G_2 in FIG. 11 and FIG. 12.

The first and second hinge barrels 240_1 and 240_2 and the first and second rotor cams 221 and 222 may rotate about the plurality of rotation axes RX when the display device 1 is folded or unfolded.

Figure 14:
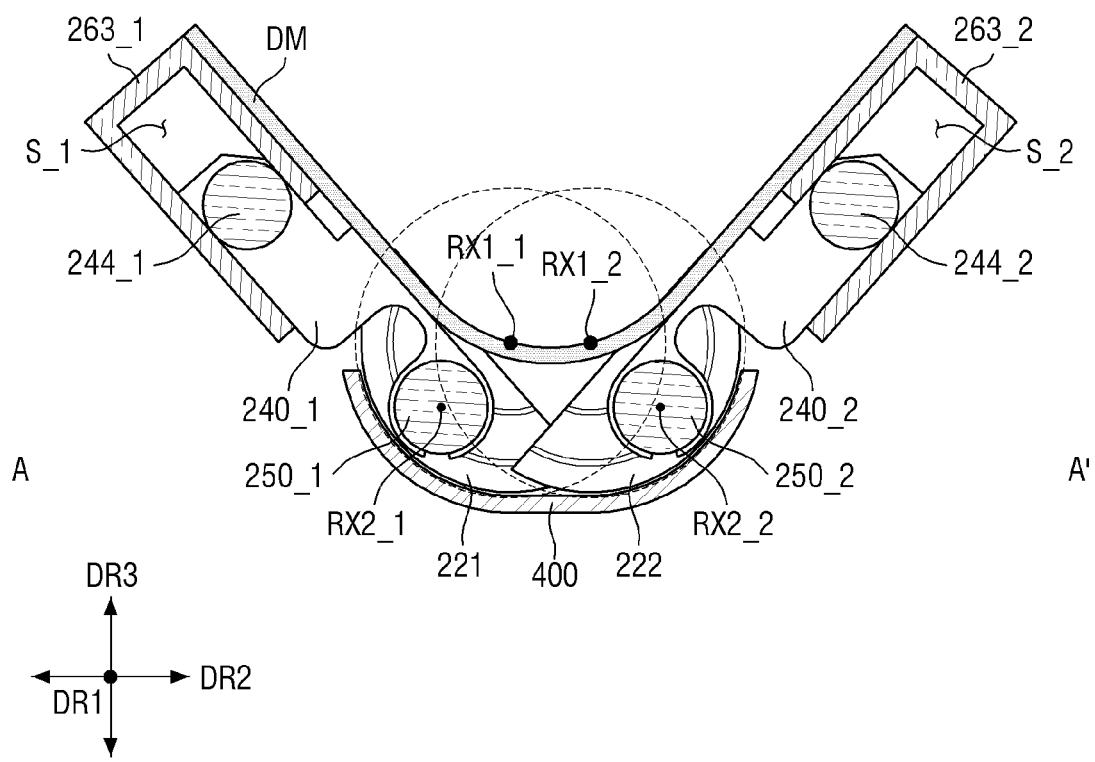
FIG. 14 is a cross-sectional view taken along line A-A' of FIG. 6 in a first folded state of the display device.
Figure 15:
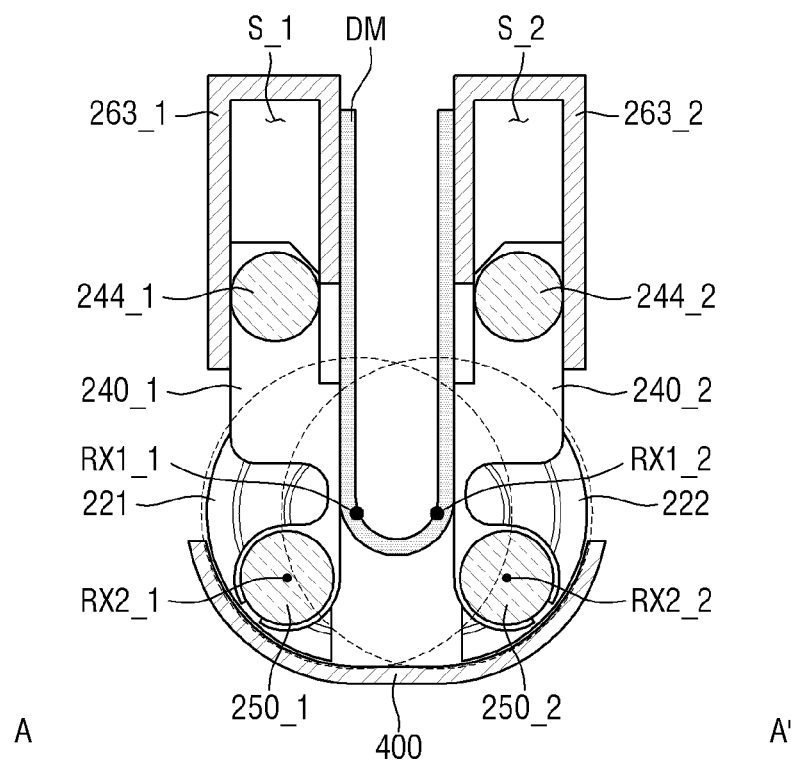
FIG. 15 is a cross-sectional view taken along line A-A' of FIG. 6 in a second folded state of the display device.
Figure 15:
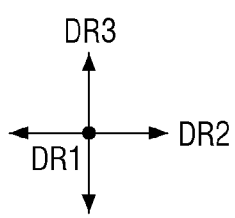

Hereinafter, detailed descriptions are made of the plurality of rotation axes RX and rotations of the members about the rotation axes RX with reference to FIGS. 13 to 15.

Figure 13:
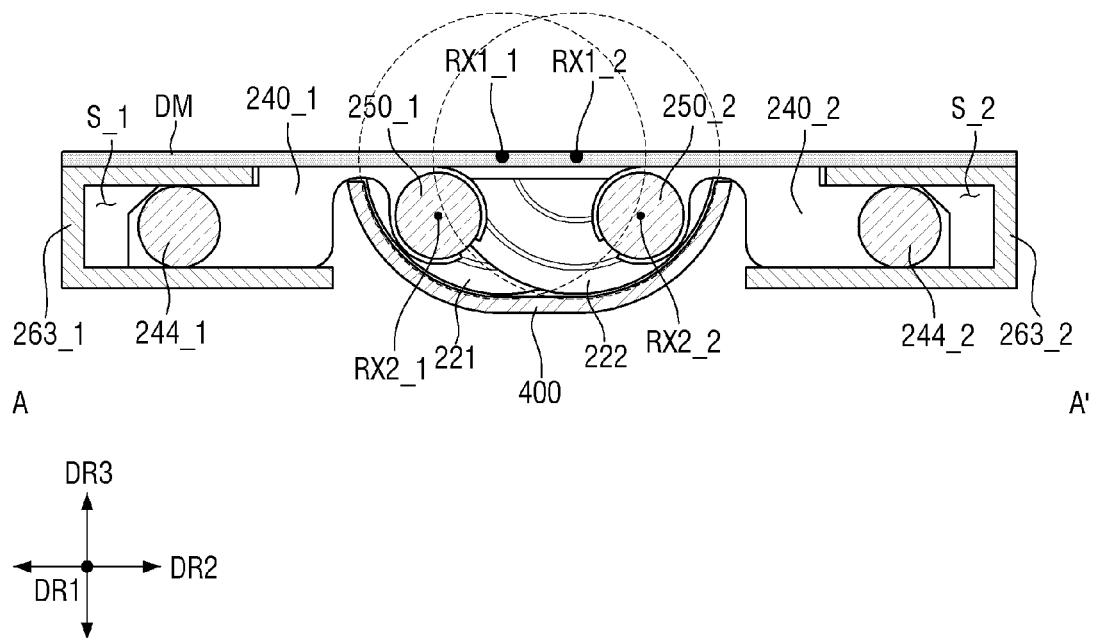
FIG. 13 is a cross-sectional view taken along line A-A' of FIG. 6 in an unfolded state of the display device.

FIG. 13 is a cross-sectional view taken along line A-A' of FIG. 6 in an unfolded state of the display device. FIG. 14 is a cross-sectional view taken along line A-A' of FIG. 6 in a first folded state of the display device. FIG. 15 is a cross-sectional view taken along line A-A' of FIG. 6 in a second folded state of the display device.

With reference to FIGS. 2 and 13 to 15, the hinge 200 may provide the plurality of rotation axes RX as described above.

The plurality of rotation axes RX may include the first rotation axis RX1_1, the second rotation axis RX1_2, a third rotation axis RX2_1, and a fourth rotation axis RX2_2.

The first rotation axis RX1_1, the second rotation axis RX1_2, the third rotation axis RX2_1, and the fourth rotation axis RX2_2 extend in parallel in the first direction DR1. In one embodiment, the first and second rotation axes RX1_1 and RX1_2 may be provided by the first and second rotor cams 221 and 222, respectively, and the third and fourth rotation axes RX2_1 and RX2_2 may be provided by the first and second hinge pins 250_1 and 250_2, respectively.

The first and second rotation axes RX1_1 and RX1_2 may be arranged symmetrically about the center of the hinge 200 in a plan view. Likewise, the third and fourth rotation axes RX2_1 and RX2_2 may be arranged symmetrically about the center of the hinge 200 in a plan view. That is, the first and second rotation axes RX1_1 and RX1_2 and the third and fourth rotation axes RX2_1 and RX2_2 may be arranged symmetrically about a virtual center line CL passing through the center of the hinge 200 in cross-sectional view, as shown in FIG. 13.

The distance between the first and second rotation axes RX1_1 and RX1_2 may be less than the distance between the third and fourth rotation axes RX2_1 and RX2_2. The distance between the first and third rotation axes RX1_1 and RX2_1 and the distance between the second and fourth rotation axes RX2 and RX4 may be equal to each other.

The first supporting member 110 rotates about the first rotation axis RX1_1, and the second supporting member 120 rotates about the second rotation axis RX1_2. In detail, the first supporting member 110 may rotate along with the first rotor cam 221 rotating about the first rotation axis RX1_1, and the second supporting member 120 may rotate along with the second rotor cam 222 rotating about the second rotation axis RX1_2. As described above, the first and second supporting members 110 and 120 may rotate in opposite directions. For example, the first supporting member 110 may rotate in the clockwise direction and the second supporting member 120 may rotate in the counterclockwise direction when the display device 1 is folded.

The first hinge barrel 240_1 rotates about the third rotation axis RX2_1, and the second hinge barrel 240_2 rotates about the fourth rotation axis RX2_2. The first and second hinge barrels 240_1 and 240_2 may rotate in opposite directions. The first and second hinge barrels 240_1 and 240_2 may rotate along with the first rotor cam 221 (the first supporting member 110) and the second rotor cam 222 (the second supporting member 120), respectively. For example, the first hinge barrel 240_1 may rotate in the clockwise direction and the second hinge barrel 240_2 may rotate in the counterclockwise direction when the display device is folded.

The insertion depth of the hinge barrel receiving part 263_1 of the first connection bracket 260_1 of the first hinge barrel 240_1 and the insertion depth of the hinge barrel receiving part 263_2 of the second hinge barrel 240_2 may vary according to the angle between the first and second supporting members 110 and 120. In detail, as the angle between the first and second supporting members 110 and 120 decreases, the distance between the end of the first hinge barrel 240_1 received in the hinge barrel receiving part 263_1 of the first hinge barrel 240_1 and the inner wall of the hinge barrel receiving part 263_1 facing the end and the distance between the end of the second hinge barrel 240_2 received in the hinge barrel receiving part 263_2 of the second hinge barrel 240_2 and the inner wall of the second connection bracket 260_2 facing the end may increase. The angle between the first and second supporting members 110 and 120 may be an angle between the top surface of the first supporting member 110 and the top surface of the second supporting member 120. Depending on the arrangement of the plurality of rotation axes RX, the first and second hinge barrels 240_1 and 240_2 may be arranged to be inclined with respect to the first and second connection brackets 260_1 and 260_2, respectively, when the display device 1 is in the first folded state.

With reference to FIGS. 2 and 13 to 15, the display device 1 may stop at a certain angle in the course of being folded or unfolded. The certain angle may be an angle between the first and second hinge barrels 240_1 and 240_2, an angle between the first and second connection brackets 260_1 and 260_2, an angle between the first and second supporting members 110 and 120, and/or an angle between the first and second non-folding areas NFA1 and NFA2. In detail, the display device 1 may retain the certain angle unless the external force or torque applied to the display device 1 is greater than a predetermined force or torque. The predetermined torque may be a friction toque produced by the friction force between the first hinge pin 250_1 and the first hinge barrel 240_1 and the friction force between the second hinge pin 250_2 and the second hinge barrel 240_2. The angle between the first and second hinge barrels 240_1 and 240_2, the angle between the first and second connection brackets 260_1 and 260_2, the angle between the first and second supporting members 110 and 120, and/or the angle between the first and second non-folding areas NFA1 and NFA2 are substantially identical with one another.

For example, as shown in FIG. 13, the display device 1 may maintain the angle between the first and second connection brackets 260_1 and 260_2 or between the first and second hinge barrels 240_1 and 240_2 at approximately 180°. In the case where a torque equal to or greater than a predetermined level is applied, the display device 1 may be folded such that the first and second connection brackets 260_1 and 260_2 forms an angle in the approximate range greater than 0° and less than 180°, e.g., approximately 45°, 90°, or 135°. Afterward, if it does not continue to apply the torque greater than the predetermined level, the angle between first and second connection brackets 260_1 and 260_2 may remain constantly. If it continues to apply the torque greater than the predetermined level, the display device 1 may be completely folded such that the first and second connection brackets 260_1 and 260_2 forms an angle of approximately 0° or 360°. Afterward, if it does not continue to apply the torque greater than the predetermined level, the display device 1 may remain in the completely folded state. That is, the display device 1 may continue being folded/unfolded by a torque equal to or greater than the predetermined level, changing the angle between the first and second supporting members 110 and 120, and it may stop being folded/unfolded by a torque less than the predetermined level, maintaining the angle between the first and second supporting members 110 and 120.

Figure 16:
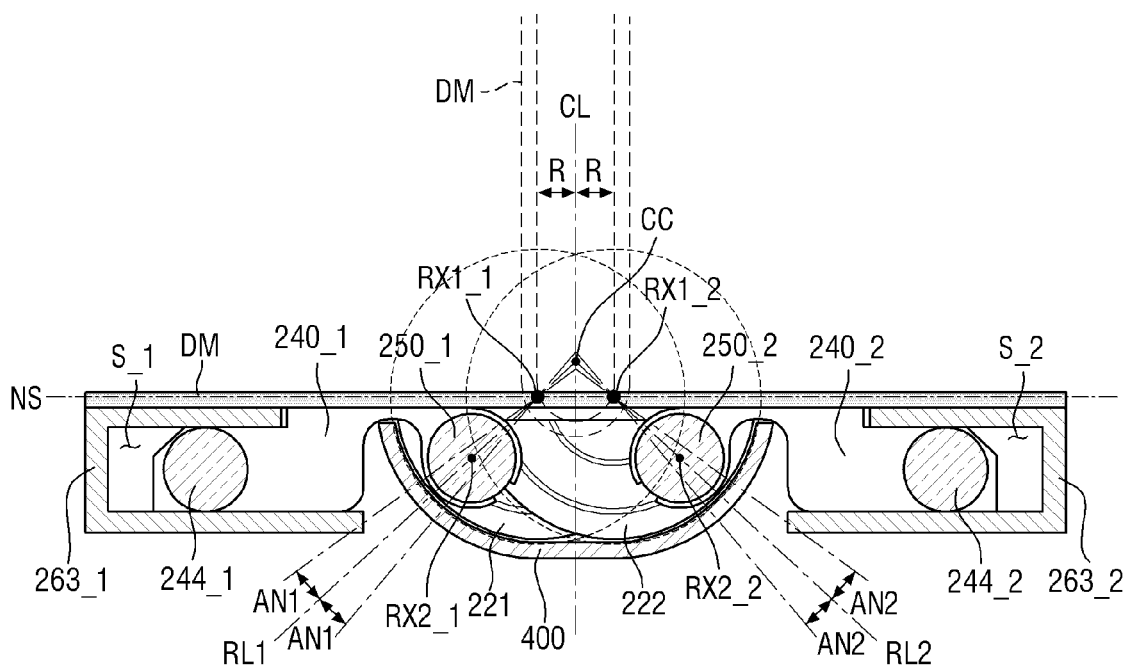
FIG. 16 is a cross-sectional view showing a locational relationship of rotation axes of FIG. 13.
Figure 16:
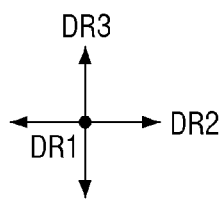
Figure 17:
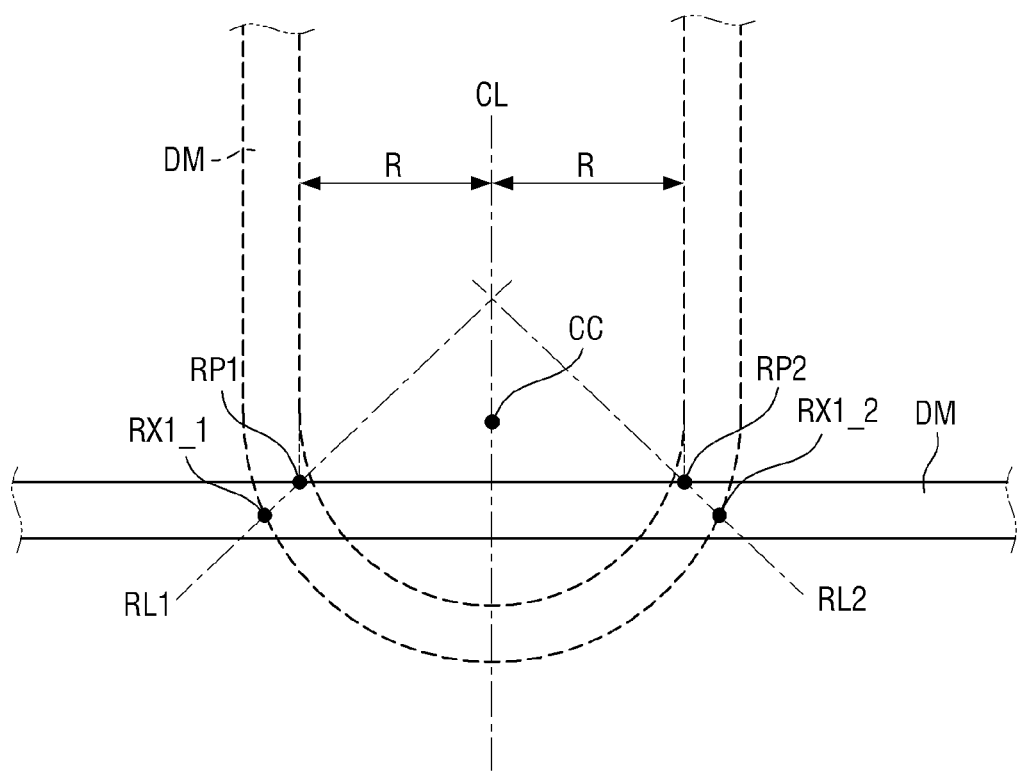
FIG. 17 is a cross-sectional view of a display module and first and second rotation axes of FIG. 16.

FIG. 16 is a cross-sectional view showing a locational relationship of rotation axes of FIG. 13. FIG. 17 is a cross-sectional view of a display module and first and second rotation axes of FIG. 16.

In FIG. 17, other components are omitted with the exception of the display module for convenience of explanation.

With reference to FIGS. 13 to 17, the first and second rotation axes RX1_1 and RX1_2 may be arranged outside the hinge 200. The third and fourth rotation axes RX2_1 and RX2_2 may be arranged to pass through the inside of the hinge 200. In one embodiment, the first and second rotation axes RX1_1 and RX1_2 may be arranged in the display module DM, and the third and fourth rotation axes RX2_1 and RX2_2 may be arranged below the display module DM in a cross-sectional view. In detail, the first and second rotation axes RX1_1 and RX1_2 may be arranged on the top surface or bottom surface of the display module DM, or inside the display module DM.

The first and second rotation axes RX1_1 and RX1_2 may be arranged to have a first distance from a curvature center CC of the display panel 10, and the third and fourth rotation axes RX2_1 and RX2_2 may be arranged to have a second distance from the curvature center CC of the display panel 10. In one embodiment, the curvature center CC may not be arranged at the intersection of a first reference line RL1 and a second reference line RL2 (to be described later). In some embodiments, the curvature center CC may be arranged at the intersection of the first and second reference lines RL1 and RL2 (to be described later). As described above, the curvature center CC of the display panel 10 may be a curvature center of a portion of the display module DM arranged at the folding area FA to be folded or unfolded as the display device 1 is folded or unfolded. The curvature center CC of the display panel 10 may overlap the center of the hinge 200 in the thickness direction. In one embodiment, the first distance may be equal to or less than the second distance. In one embodiment, the first distance may be the curvature radius R of the display panel 10. The curvature radius R may be a distance between the top surfaces or bottom surfaces of one and the other parts of the display panel 10 that are arranged to face each other when the display panel 10 is folded.

With reference to FIG. 17, the first and second rotation axes RX1_1 and RX1_2 may be arranged on the first and second reference lines RL1 and RL2 respectively. In detail, it may be possible to define the center line CL that is, when the display device 1 is unfolded, perpendicular to the top surface or the bottom surface of the display panel 10 and passing through the curvature center CC of the display panel 10. It may also be possible to define a first reference point RP1 and a second reference point RP2 separated by the curvature radius R of the display panel 10 from the center line CL in the second direction DR2 on the top surface of the display panel 10. The first and second reference lines RL1 and RL2 may pass through the first and second reference points RP1 and RP2 respectively and each form an angle of 45° with the center line CL. In detail, as shown in FIG. 16, the first reference line RL1 may be arranged to form an angel of approximately 45° with the center line CL in the clockwise direction, and the second reference line RL2 may be arranged to form an angle of approximately 45° with the center line CL in the counterclockwise direction. That is, the first and second reference lines RL1 and RL2 may be arranged to cross each other at a right angle. The first and second rotation axes RX1_1 and RX1_2 may be arranged at parts of the first and second reference lines RL1 and RL_2, respectively, overlapping the display module DM in cross-sectional view. The parts of the first and second reference lines RL1 and RL2 may include a point at which the stress applied to the display module DM is minimized, e.g. at least one point on a neutral surface NS or close to the neutral surface NS.

With reference to FIGS. 16 and 17, the third and fourth rotation axes RX2_1 and RX2_2 may be arranged in a predetermined range with respect to the first and second reference lines RL1 and RL2. In detail, the third rotation axis RX2_1 may be arranged within a first angle AN1 in the clockwise or counterclockwise direction from the first reference line RL1 about the first rotation axis RX1_1, and the fourth rotation axis RX2_2 may be arranged within a second angel AN2 in the clockwise or counterclockwise direction from the second reference line RL2 about the second rotation axis RX1_2. The first and second angles AN1 and AN2 may be equal or unequal to each other. In one embodiment, the first and second angles AN1 and AN2 may be approximately greater than 0° and equal to or less than 10°. In some embodiments, the first and second angles AN1 and AN2 may be approximately 5°.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A display device comprising:
a display module including a first surface and a second surface opposite to the first surface;
a hinge disposed on the second surface of the display module;
a first supporting member connected to a first side of the hinge; and
a second supporting member connected to a second side of the hinge, the second side being opposite the first side,
wherein the hinge includes:
a base frame;
a first hinge pin disposed on a first side of the base frame;
a second hinge pin disposed on a second side of the base frame, the second side of the base frame being opposite the first side of the base frame;
a first hinge barrel rotatably coupled to the first hinge pin; and
a second hinge barrel rotatably coupled to the second hinge pin,
wherein the first hinge barrel and the second hinge barrel are rotatable independent of one another.

2. The display device of claim 1, wherein each of the first hinge barrel and the second hinge barrel includes a body part, a barrel part connected to a first side of the body part, and a pair of sliding poles protruding from the body part.

3. The display device of claim 2, wherein the first hinge pin and the second hinge pin are inserted into the barrel part of the first hinge barrel and the barrel part of the second hinge barrel, respectively.

4. The display device of claim 2, further comprising:
a hinge cover covering a bottom side of the base frame,
wherein each of the first hinge barrel and the second hinge barrel provides a hinge cover-receiving groove defined between the body part and the barrel part.

5. The display device of claim 1, wherein the first hinge barrel rotates along with rotation of the first supporting member, and the second hinge barrel rotates along with rotation of the second supporting member.

6. The display device of claim 1, wherein the hinge further includes:
a first rotor cam coupled to the base frame;
a first connection bracket connecting the first supporting member to the first rotor cam; and
a second connection bracket connecting the second supporting member to the second rotor cam.

7. The display device of claim 6, wherein one side of the first hinge barrel is slidably inserted into the first connection bracket, and one side of the second hinge barrel is slidably inserted into the second connection bracket.

8. The display device of claim 1, wherein when a torque equal to or greater than a predetermined level is applied to the display device, an angle between the first supporting member and the second supporting member is varied, and when a torque less than the predetermined level is applied to the display device, the angle between the first supporting member and the second supporting member is maintained.

9. A display device comprising:
a display module including a first surface and a second surface opposite to the first surface;
a hinge disposed on the second surface of the display module;
a first supporting member connected to a first side of the hinge; and
a second supporting member connected to a second side of the hinge, the second side being opposite the first side,
wherein the hinge includes:
a base frame;
a first hinge pin disposed on a first side of the base frame;
a second hinge pin disposed on a second side of the base frame, the second side of the base frame being opposite the first side of the base frame;
a first hinge barrel rotatably coupled to the first hinge pin; and
a second hinge barrel rotatably coupled to the second hinge pin,
wherein each of the first hinge barrel and the second hinge barrel includes a body part, a barrel part connected to a first side of the body part, and a pair of sliding poles protruding from the body part, and
wherein the barrel part defines a slit.

10. The display device of claim 9, wherein each of the first hinge barrel and the second hinge barrel further includes a connection part connecting the body part to the barrel part, a first side of the barrel part is connected to the connection part, and the slit is defined on a second side of the barrel part opposite to the first side of the barrel part with respect to a curvature center of the barrel part.

11. The display device of claim 9, wherein the hinge is configured to provide a rotation axes in a first direction.

12. The display device of claim 11, wherein the slit extends in the first direction.

13. The display device of claim 9, wherein the first hinge pin and the second hinge pin are inserted into the barrel part of the first hinge barrel and the barrel part of the second hinge barrel, respectively.

14. The display device of claim 9, further comprising:
a hinge cover covering a bottom side of the base frame,
wherein each of the first hinge barrel and the second hinge barrel provides a hinge cover-receiving groove defined between the body part and the barrel part.

15. A display device comprising:
a display module including a first surface and a second surface opposite to the first surface;
a hinge disposed on the second surface of the display module;
a first supporting member connected to a first side of the hinge; and
a second supporting member connected to a second side of the hinge, the second side being opposite the first side,
wherein the hinge includes:
a base frame;
a first hinge pin disposed on a first side of the base frame;
a second hinge pin disposed on a second side of the base frame, the second side of the base frame being opposite the first side of the base frame; and
wherein each of the first hinge pin and the second hinge pin includes a cylindrical part, a head part disposed on a first end of the cylindrical part, a tail part disposed on a second end of the cylindrical part, and a locking part between the cylindrical part and the head part.

16. The display device of claim 15, further comprising:
a first hinge barrel rotatably coupled to the first hinge pin; and
a second hinge barrel rotatably coupled to the second hinge pin.

17. The display device of claim 16, wherein each of the first hinge barrel and the second hinge barrel includes a body part, a barrel part connected to a first side of the body part, and a pair of sliding poles protruding from the body part.

18. The display device of claim 17, wherein the first hinge pin and the second hinge pin are inserted into the barrel part of the first hinge barrel and the barrel part of the second hinge barrel, respectively.

19. The display device of claim 15, further comprising:
a hinge cover covering a bottom side of the base frame,
wherein each of the first hinge barrel and the second hinge barrel provides a hinge cover-receiving groove defined between the body part and the barrel part.

20. The display device of claim 15, wherein the first hinge barrel rotates along with rotation of the first supporting member, and the second hinge barrel rotates along with rotation of the second supporting member.

* * * * *